United States Patent
Muruganathan et al.

(10) Patent No.: US 10,389,422 B2
(45) Date of Patent: Aug. 20, 2019

(54) REPORTING IN DIFFERENT DIMENSIONS

(71) Applicant: Telefonaktiebolaget LM Ericsson (publ), Stockholm (SE)

(72) Inventors: Siva Muruganathan, Stittsville (CA); Mattias Frenne, Uppsala (SE); Shiwei Gao, Nepean (CA); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/776,435

(22) PCT Filed: Nov. 16, 2016

(86) PCT No.: PCT/SE2016/051126
§ 371 (c)(1),
(2) Date: May 16, 2018

(87) PCT Pub. No.: WO2017/086864
PCT Pub. Date: May 26, 2017

(65) Prior Publication Data
US 2018/0343045 A1    Nov. 29, 2018

Related U.S. Application Data

(60) Provisional application No. 62/255,728, filed on Nov. 16, 2015.

(51) Int. Cl.
*H04B 7/06* (2006.01)
*H04B 17/10* (2015.01)
*H04W 24/10* (2009.01)

(52) U.S. Cl.
CPC ......... *H04B 7/0617* (2013.01); *H04B 7/0619* (2013.01); *H04B 17/104* (2015.01); *H04W 24/10* (2013.01)

(58) Field of Classification Search
CPC .. H04B 7/0617; H04B 17/104; H04B 7/0619; H04W 24/10
See application file for complete search history.

(56) References Cited

U.S. PATENT DOCUMENTS 9,377,522 B2 *  6/2016  Edge .......................... G01S 1/66
2014/0192917 A1   7/2014  Nam et al.
(Continued)

FOREIGN PATENT DOCUMENTS

WO    2014142516 A1   9/2014
WO    2015060681 A1   4/2015

OTHER PUBLICATIONS

ETSI, "LTE; Evolved Universal Terrestrial Radio Access (E-UTRA); Physical layer procedures (3GPP TS 36.213 version 12.3.0 Release 12)", ETSI TS 136 213 V12.3.0, Oct. 2014, 1-214.
(Continued)

*Primary Examiner* — Kabir A Timory
(74) *Attorney, Agent, or Firm* — Sage Patent Group

(57) ABSTRACT

The disclosure pertains to a method for operating a terminal (10) in a wireless communication network, the method comprising performing reporting based on a configuration, the configuration indicating the timing of reporting of first angular transmission information and/or indicating the timing of reporting of second angular transmission information. The disclosure also pertains to related methods and devices.

4 Claims, 16 Drawing Sheets

(56) References Cited

U.S. PATENT DOCUMENTS

2016/0211902 A1 7/2016 Park et al.
2017/0033916 A1* 2/2017 Stirling-Gallacher ........................ H04L 5/1438

OTHER PUBLICATIONS

ETSI, "LTE; Evolved Universal Terrestrial Radio Access (E-UTRA); Radio Resource Control (RRC); Protocol specification (3GPP TS 36.331 version 12.3.0 Release 12)", ETSI TS 136 331 V12.3.0, Sep. 2014, 1-383.

Unknown, Author, "Codebook design with W2-only feedback for class B CSI reporting", 3GPP TSG RAN WG1 Meeting #82bis, R1-156086, Malmö, Sweden, Oct. 5-9, 2015, 1-4.

Unknown, Author, "Joint Proposal on Rank 2 codebook for Class A CSI reporting", 3GPP TSG RAN WG1 Meeting #82b, R1-156335, Malmo, Sweden, Oct. 5-9, 2015, 1-2.

Unknown, Author, "Joint proposal on rank 3-8codebook", 3GPP TSG RAN WG1 Meeting #83, R1-156390, Anaheim, USA, Oct. 16-20, 2015, 1-8.

Unknown, Author, "WF on class A and class B CSI reporting for Rel.13 EB/FD-MIMO", 3GPP TSG RAN WG1 Meeting #82bis, R1-156217, Malmö, Sweden, Oct. 5-9, 2015, 1-10.

Unknown, Author, "WF on FD-MIMO codebook", 3GPP TSG-RAN WG1#82, R1-154861, Beijing, China, Aug. 24-28, 2015, 1-7.

* cited by examiner

| Config | Selected $i_2$ indices | $(s_1, s_2)$ |
|---|---|---|
| Config 1 | 0 – 3 | (1,1) |
| Config 2 | 0 – 7, 16 – 23 | (2,2) |
| Config 3 | 0-3, 8-11, 20-23, 28-31 | (2,2) |
| Config 4 | 0 – 15 | (2,2) |

Fig. 15

| Config | Selected $i'_2$ indices | (s1,s2) |
|---|---|---|
| Config 1 | 0-1 | (1,1) |
| Config 2 | 0-3, 8-9, 16-19, 22-23, 28-31 | (2,2) |
| Config 3 | 0-1, 4-5, 8-9, 12-13, 18-21, 24-27 | (2,2) |
| Config 4 | 0-15 | (2,2) |

REPORTING IN DIFFERENT DIMENSIONS

TECHNICAL FIELD

The present disclosure pertains to wireless communication technology, in particular in the context of a Radio Access Network, e.g. according to 3GPP LTE (Long Term Evolution) and/or NR (New Radio) standardization.

BACKGROUND

Wireless communication technology increasingly utilises multiple antenna arrays for transmission and reception, e.g. for beamforming. The radiation profiles received from such antenna arrays, e.g. caused by using different sets of antenna elements of such arrays, and their development in time, can be quite anisotropic, e.g. showing very different behaviour in different angular regimes, e.g. in horizontal angles and vertical angles. A terminal receiving transmissions from an antenna array (e.g., used by a base station or network node), may thus see very different reception behaviour depending on direction or dimension (angular dimension).

SUMMARY

It is an object of the present disclosure to provide approaches facilitating improved reporting (e.g., in relation to measurements) by a terminal in particular for anisotropic transmission profiles and/or for reception from an antenna array.

Accordingly, there is disclosed a method for operating a terminal in a wireless communication network. The method comprises performing reporting based on a configuration, the configuration indicating the timing of reporting of first angular transmission information and/or indicating the timing of reporting of second angular transmission information. Thus, timing may be adapted for different angular behaviour, allowing a flexible handling of different behaviour in different (angular) dimensions. Moreover, identifying different angular transmission dimensions may be facilitated.

Also, there is proposed a terminal for a wireless communication network. The terminal is adapted for performing reporting based on a configuration, the configuration indicating the timing of reporting of first angular transmission information and/or indicating the timing of reporting of second angular transmission information.

A method for operating a network node in a wireless communication network may be considered. The method comprises configuring a terminal for performing reporting, wherein configuring comprises indicating different timings for reporting of first angular transmission information and second angular transmission information. Accordingly, the terminal may be configured by the network node in a flexible and improved manner to accommodate different angular and/or dimensional behaviour or conditions.

Moreover, there is disclosed a network node for a wireless communication network. The network node is adapted for configuring a terminal for performing reporting, wherein configuring comprises indicating different timings for reporting of first angular transmission information and second angular transmission information.

A program product may be envisioned, the program product comprising code executable by control circuitry, the code causing the control circuitry to carry out and/or control any of the methods disclosed herein.

In addition, there is described a carrier medium arrangement carrying and/or storing a program product as described herein.

BRIEF DESCRIPTION OF THE DRAWINGS

The drawings are provided to illustrate the approaches described herein and are not intended to limit their scope unless specifically stated otherwise. The drawings comprise:
FIG. 15, showing a table for Selection of and $(s_1,s_2)$ for Rank-1 Class A Codebook;
and
FIG. 16, showing a table for selection of $i'_2$ and $(s_1,s_2)$ for Rank-2 Class A Codebook.

DETAILED DESCRIPTION

Figure 1:
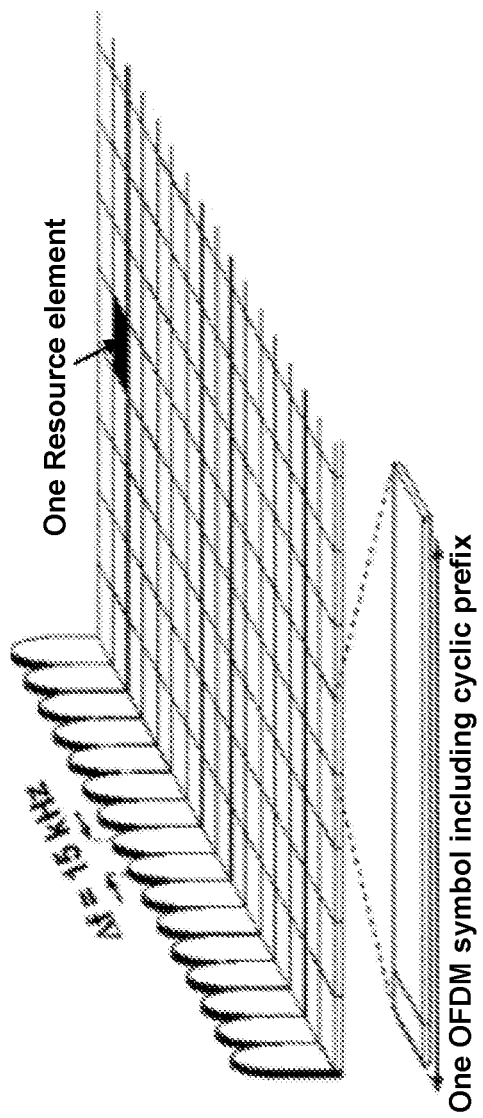
FIG. 1, showing a LTE time-domain structure.
Figure 2:
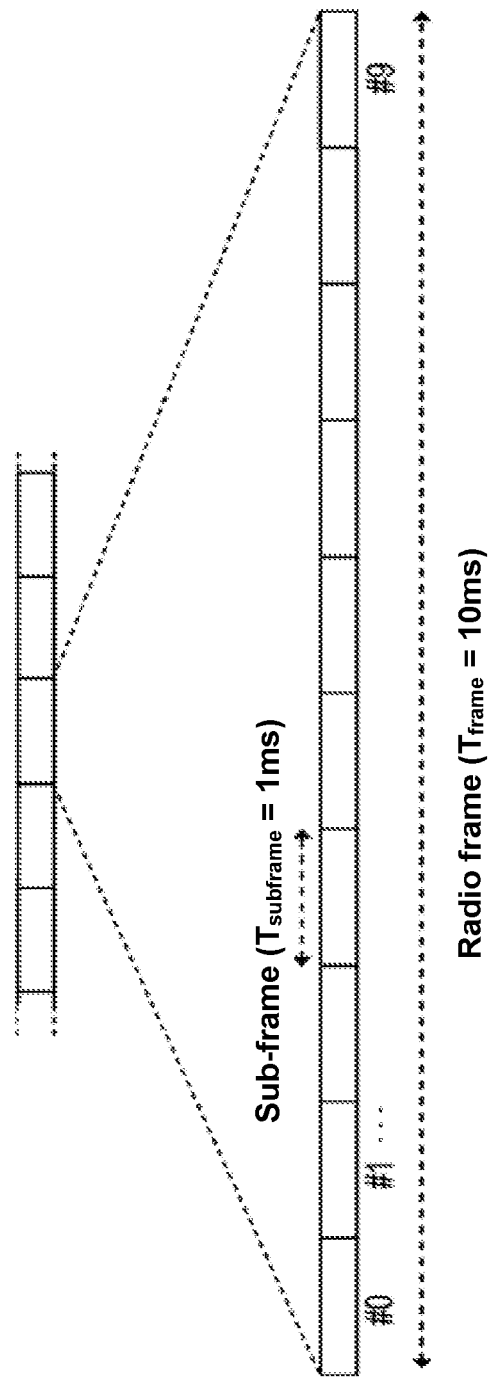
FIG. 2, showing a downlink subframe.

In the following, concepts and approaches are described mainly in reference to an LTE based system. However, they are applicable to other kinds of Radio Access Technology (RAT), e.g. 5G technology and/or NR.

PMI (Precoder Matrix Index) may be reported by a terminal to indicate a preferred precoder for beam forming by a base station or network node.

Generally, in many practical deployments, vertical PMI may vary much slower than the horizontal PMI (in some applications the situation may be reversed, e.g. depending on a UEs movement). This is due to the higher angular spreads associated with the channel in the horizontal dimension when compared to the angular spreads in the vertical dimension. Therefore, from the perspective of reducing the feedback overhead on PUCCH, it may be desirable that the vertical PMI and the horizontal PMI are separately reported with different feedback periods during periodic CSI feedback.

The Rel-13 class A codebook described in below utilizes a first PMI index in or for dimensions 1 and 2 which are denoted by $i_{1,1}$ and $i_{1,2}$, respectively. However, the UE does not know which of the two dimensions is slowly varying and which one is more frequently varying. Stated differently, the UE does not know which one of $i_{1,1}$ and $i_{1,2}$ represents the horizontal PMI, and which one represents the vertical PMI. In order to separately report the slowly varying PMI and the more frequently varying PMI with different periodicities, it is a problem how to identify the dimension corresponding to the slowly varying PMI and the dimension corresponding to the more frequently varying PMI at the UE. Since the Rel-13 class A codebook is configurable (via the 5 RRC configured parameters described herein), it is also a problem how to do this identification in a configurable manner.

As described herein, the orthogonal beam group parameter k is only relevant to the class A codebooks corresponding to ranks 3-4. Since the UE feeds back k as part of the $W_1$ indication, the $W_1$ for ranks 3-4 consists of the two first PMI indices $i_{1,1}$ and $i_{1,2}$ in addition to the the orthogonal beam group parameter k. In the case where the slowly varying PMI and the more frequently varying PMI are reported separately with different periodicities, it is also a problem how the orthogonal beam group parameter k should be reported Note that although terminology from 3GPP LTE has been used in this disclosure for illustrative purposes, this should not be seen as limiting the scope of the disclosure to only the aforementioned system. Other wireless systems, including WCDMA, WiFi, WiMax, LTE for unlicensed band, UMB and GSM, may also benefit from exploiting the ideas covered within this disclosure.

Also note that terminology such as eNodeB and UE should be considering non-limiting and does in particular not imply a certain hierarchical relation between the two; in general "eNodeB" or "TP" could be considered as device 1 and "UE" device 2, and these two devices communicate with each other over some radio channel. These devices may represent nodes of a wireless communication network, in particular a terminal (in particular, a UE) and/or network node (in particular a base station). A network node may generally be a radio node, which may be adapted for wireless and/or radio communication with one or more terminals or other radio nodes. Herein, occasionally it is focused on wireless transmissions in the downlink, but the disclosure is equally applicable in the uplink.

LTE uses OFDM in the downlink and DFT-spread OFDM in the uplink. The basic LTE downlink physical resource can thus be seen as a time-frequency grid as illustrated in FIG. 1, where each resource element corresponds to one OFDM subcarrier during one OFDM symbol interval.

FIG. 1 shows the LTE downlink physical resource structure.

In the time domain, LTE downlink transmissions are organized into radio frames of 10 ms duration, each radio frame consisting of ten equally-sized subframes of length Tsubframe=1 ms. For normal cyclic prefix, one subframe consists of 14 OFDM symbols. The duration of each OFDM symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about to which terminals data is transmitted and within which resource blocks the data is transmitted, in the current downlink subframe. This control signaling (PDCCH) is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards above described resource assignments can also be scheduled on the Enhanced Physical Downlink Control Channel (EPDCCH). For Rel-8 to Rel-10 only Physical Downlink Control Channel (PDCCH) is available.

Figure 3:
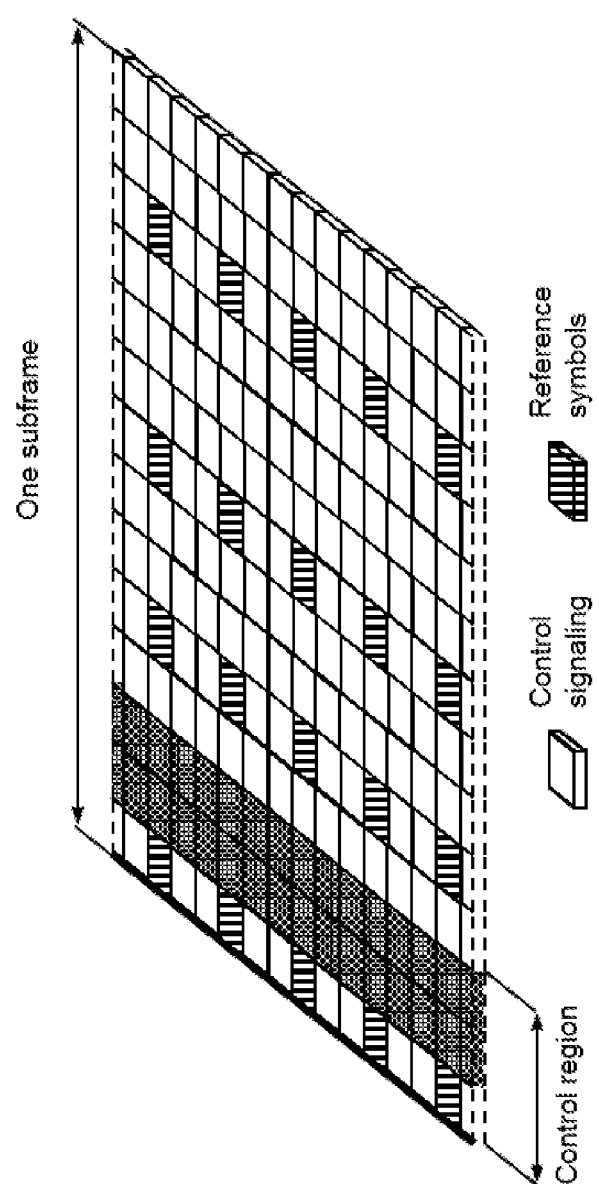
FIG. 3, showing a reference signal structure.

The reference symbols as shown in FIG. 3 are the cell specific reference symbols (CRS) and are used to support multiple functions including fine time and frequency synchronization and channel estimation for certain transmission modes.

In a cellular communication system, there is a need to measure the channel conditions in order to know what transmission parameters to use. These parameters include, e.g., modulation type, coding rate, transmission rank, and frequency allocation. This applies to uplink (UL) as well as downlink (DL) transmissions.

The scheduler that makes the decisions on the transmission parameters is typically located in the base station (eNB). Hence, it can measure channel properties of the UL directly using known reference signals that the terminals (UEs) transmit. These measurements then form a basis for the UL scheduling decisions that the eNB makes, which are then sent to the UEs via a downlink control channel.

LTE uses hybrid-ARQ (HARQ), where, after receiving downlink data in a subframe, the terminal attempts to decode it and reports to the base station whether the decoding was successful (ACK) or not (NAK). In case of an unsuccessful decoding attempt, the base station can retransmit the erroneous data.

Uplink control signaling from the terminal to the base station may comprise
    hybrid-ARQ information or acknowledgements for received downlink data; and/or
    terminal report/s related to the downlink channel conditions, used as assistance for the downlink scheduling; and/or
    scheduling requests, indicating that a mobile terminal needs uplink resources for uplink data transmissions.

A terminal report may comprise or be a channel status report, which may include other information, e.g. HARQ information and/or scheduling requests. A terminal report may comprise one or more messages and/or indications. A terminal report, in particular a channel status report, may be based on measurements performed by the terminal or UE, e.g. measurements performed on received signaling, in particular reference signals. Providing a report may be referred to as reporting. Reporting may generally comprise transmitting a corresponding message. Reporting information may comprise transmitting information and/or corresponding indications. A terminal report or channel status report may be considered as, and/or comprise, angular transmission information. Such a report may pertain to a dimension of transmission and/or beamforming and/or antenna arrangement, which may be indicated by a network node, e.g. by corresponding configuring. CSI feedback may be considered a form of a terminal report or channel status report.

Generally, a terminal or UE may be adapted to provide a channel status report and/or a terminal report based on a configuration and/or may be configured for such report/s. A terminal or UE may comprise a corresponding reporting module.

A network node like a base station or eNodeB may be adapted to configure a UE for such report. A network node may comprise a corresponding configuring module.

Reporting or providing a report may comprise performing corresponding measurements (which may provide measurement results), and/or performing an evaluation based on measurements and/or measurement results (which may include performing calculations and/or estimates based on the results, e.g. averaging and/or weighting them and/or cross-referencing with a table), and/or transmitting a (channel status and/or terminal) report and/or channel state parameter/s and/or channel state information (in particular CSI, e.g. to a network node, in particular an eNodeB, which may be the node configuring the UE (e.g. for the measurements or reports) and/or the serving node (controlling or providing one or more cells serving the UE). A terminal or UE may comprise a corresponding measuring module (for performing measurements) and/or an evaluating module (for performing evaluation) and/or a transmitting module for transmitting the report/s and/or information mentioned herein.

Channel state information may be based on an evaluation as described. Channel state information may generally comprise one or more messages. It may be considered that channel state information comprises one or more parameters (e.g., in the same or different messages) indicative of a channel status and/or based on measurements as described herein, for example indicating channel quality information (CQI) and/or information relating to MIMO operation and/or beamforming (in particular, use of multiple antennas for transmission to the terminal or UE), e.g. reception of beamformed transmission and/or indicating a MIMO/beamforming preference (e.g., indicating which precoder/s is/are preferred) and/or, a precoder setting, and/or rank information. A parameter or information, in particular information relating to MIMO/beamforming, may be related to one or more (different) dimensions. Different dimension may in particular be orthogonal dimensions, e.g. vertical and horizontal; and/or refer to orthogonal arrangements of antenna elements, e.g. on the transmitting side (network node side).

Generally, a message may comprise a control information like a header and/or header information in addition to payload data (other information and/or indications it carries). Each message may comprise its own header/header information, so that different messages may be separated by such. A header may comprise header information, which may comprise one or more parameters or indications indicating or describing the message content and/or addressee/s (target/s) and/or sender/transmitter. Alternatively or additionally, a message may comprise information subjected to joint encoding and/or modulation, respectively joint decoding and/or demodulation, and/or be associated to the same HARQ process.

Figure 4:
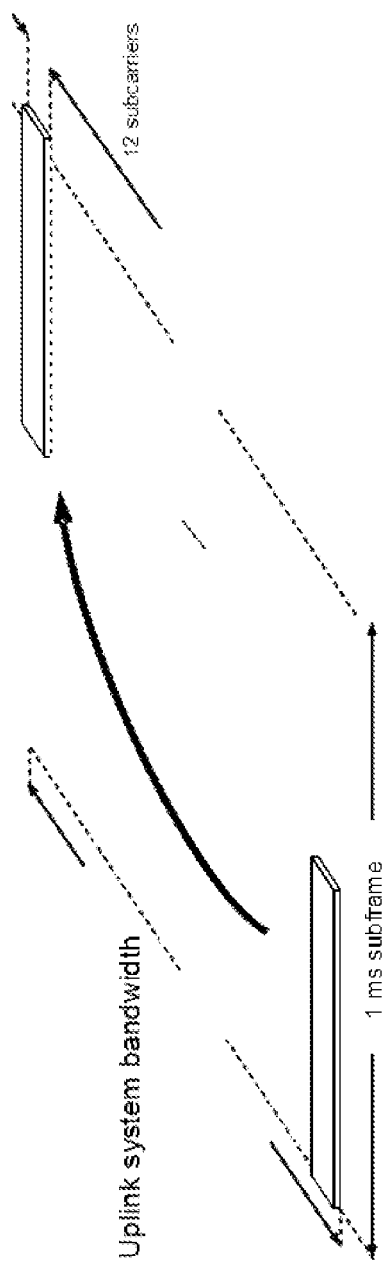
FIG. 4, showing uplink L1/L2 control signaling transmission on PUCCH.

If the mobile terminal has not been assigned (allocated or configured with) an uplink resource for data transmission, the L1/L2 control information (channel-status reports, hybrid-ARQ acknowledgments, and scheduling requests) is transmitted in uplink resources (resource blocks) specifically assigned for uplink L1/L2 control on PUCCH. As illustrated in FIG. 4, these resources may be located at the edges of the total available cell bandwidth. Each such resource consists of twelve "subcarriers" (one resource block) within each of the two slots of an uplink subframe. In order to provide frequency diversity, these frequency resources may be subjected to frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks can be assigned next to the previously assigned resource blocks.

FIG. 4 shows uplink L1/L2 control signaling transmission on PUCCH.

As mentioned above, uplink L1/L2 control signaling include hybrid-ARQ acknowledgements, channel-status reports and scheduling requests. Different combinations of these types of messages are possible as described further below, but to explain the structure for these cases it is beneficial to discuss separate transmission of each of the types first, starting with the hybrid-ARQ and the scheduling request. There are three formats defined for PUCCH, each capable of carrying a different number of bits. For this background art, PUCCH format 2 is of interest.

PUCCH format 2 is described in the following.

Channel-status reports are used to provide the eNodeB with an estimate of the channel properties at the terminal in order to aid channel-dependent scheduling. A channel-status report consists of multiple bits per subframe transmitted in the uplink control information (UCI) report. PUCCH format 1, which is capable of at most two bits of information per subframe, can obviously not be used for this purpose.

Transmission of channel-status reports on the PUCCH is instead handled by PUCCH format 2, which is capable of multiple information bits per subframe.

The PUCCH format 2 resources are semi-statically configured. A Format 2 report can carry a payload of at most 11 bits. Variants of format 2 are format 2a and 2b that also carries HARQ-ACK information of 1 and 2 bits respectively for normal cyclic prefix. For extended cyclic prefix, PUCCH Format 2 can also carry HARQ-ACK information. For simplicity, they are all referred to as format 2 herein.

Codebook-based precoding is discussed in the following.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. Currently LTE-Advanced supports an 8-layer spatial multiplexing mode for 8 Tx antennas with channel dependent precoding. The spatial multiplexing mode is aimed for high data rates in favorable channel conditions. An illustration of the spatial multiplexing operation is provided in FIG. 5.

Figure 5:
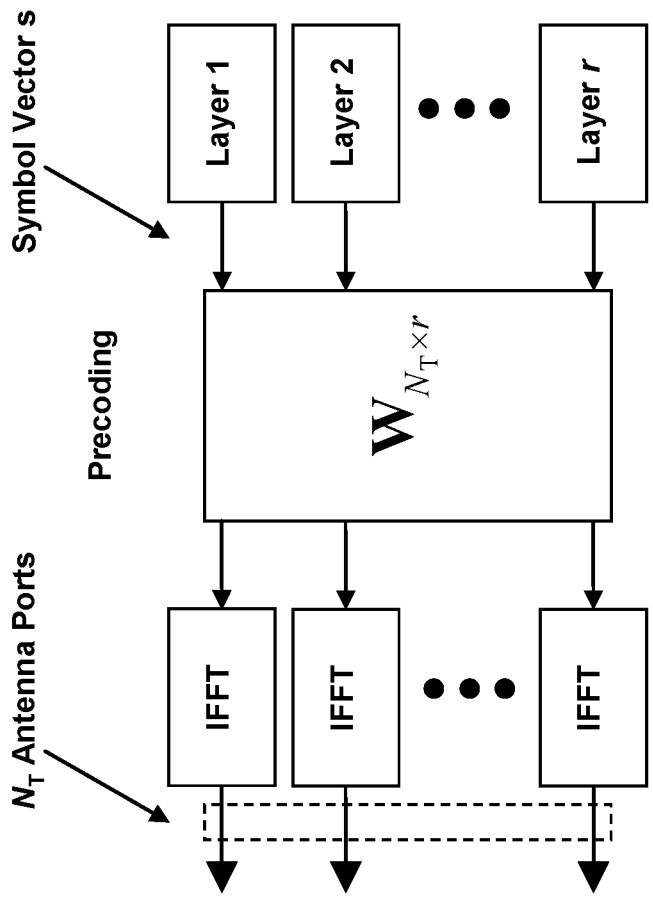
FIG. 5, showing a transmission structure of precoded spatial multiplexing mode in LTE.

FIG. 5 shows a transmission structure of precoded spatial multiplexing mode in LTE. As can be seen, the information carrying symbol vector s is multiplied by an $N_T \times r$ precoder matrix w, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties. PMI may be a parameter of a report and/or channel status information.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process.

The precoder, w, can be a wideband precoder, which is constant over frequency, or frequency selective.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

The transmission rank, and thus the number of spatially multiplexed layers, is reflected in the number of columns of the precoder. For efficient performance, it is important that a transmission rank that matches the channel properties is selected. The transmission rank may be indicated by rank information.

Channel State Information Reference Symbols (CSI-RS)

In LTE Release-10, a new reference symbol sequence was introduced for the intent to estimate channel state information, the CSI-RS. The CSI-RS provides several advantages over basing the CSI feedback on the common reference symbols (CRS) which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

By measuring on a CSI-RS a UE can estimate the effective channel the CSI-RS is traversing including the radio propagation channel and antenna gains. In more mathematical rigor this implies that if a known CSI-RS signal x is transmitted, a UE can estimate the coupling between the transmitted signal and the received signal (i.e., the effective channel). Hence if no virtualization is performed in the transmission, the received signal y can be expressed as $$y = Hx + e$$

and the UE can estimate the effective channel H.

Up to eight CSI-RS ports can be configured for a Rel. 11 UE, that is, the UE can thus estimate the channel from up to eight transmit antennas.

Implicit CSI Feedback is discussed in the following.

For CSI feedback LTE has adopted an implicit CSI mechanism where a UE does not explicitly report e.g., the complex valued elements of a measured effective channel, but rather the UE recommends a transmission configuration for the measured effective channel. The recommended transmission configuration thus implicitly gives information about the underlying channel state. The recommended transmission configuration may be seen as channel status information and/or be represented by a terminal report or channel status report and/or at least one channel status parameter.

In LTE, the CSI feedback (channel status information or terminal/channel status report) is given in terms of a transmission rank indicator (RI), a precoder matrix indicator (PMI), and one or two channel quality indicator(s) (CQI). The CQI/RI/PMI report can be wideband or frequency selective depending on which reporting mode that is configured. These parameters may be seen a indicative of a channel status.

The RI corresponds to a recommended number of streams that are to be spatially multiplexed and thus transmitted in parallel over the effective channel. The PMI identifies a recommended precoding matrix codeword (in a codebook which contains precoders with the same number of rows as the number of CSI-RS ports) for the transmission, which relates to the spatial characteristics of the effective channel. The CQI represents a recommended transport block size (i.e., code rate) and LTE supports transmission of one or two simultaneous (on different layers) transmissions of transport blocks (i.e. separately encoded blocks of information) to a UE in a subframe. There is thus a relation between a CQI and an SINR of the spatial stream(s) over which the transport block or blocks are transmitted.

For CSI feedback or reporting, both periodic and aperiodic (i.e. triggered by eNB) reports are supported. The periodic CSI and aperiodic CSI reports are known as P-CSI and A-CSI, respectively. The periodic report uses PUCCH format 2 or its variants (PUCCH format 2a, or PUCCH format 2b), which can carry at most 11 bits. RI, PMI and CQI reports can be configured with different periodicities and thus may be reported at different times or subframes. Typically, rank changes slowly and thus RI can be reported less frequently than PMI and CQI.

2D Antenna Arrays are discussed in the following.

Recent development in 3GPP has led to the discussion of two-dimensional antenna arrays where each antenna element has an independent phase and amplitude control, thereby enabling beamforming in both in the vertical and the horizontal dimensions. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N = N_h N_v N_p$. An example of an antenna where $N_h = 8$ and $N_v = 4$ is illustrated below. It furthermore consists of cross-polarized antenna elements meaning that $N_p = 2$. Such an antenna will be denoted as an 8×4 antenna array with cross-polarized antenna elements.

However, from a standardization perspective, the actual number of elements antenna array is not visible to the UE, but rather the antenna ports, where each port corresponds to a CSI reference signal. A port may indicate or represent a mapping of signaling to one or more (physical or virtual) antenna elements, which may be used by the network node for transmission. The mapping may indicate phase/s and/or amplitude/s for the antenna element/s and/or which antenna element/s to use for transmitting the signaling.

The UE can thus measure the channel from each of these ports. Similarly, whether the antenna elements are distributed horizontally or vertically along the first or second dimensions is also not visible to the UE. Therefore, a 2D port layout is introduced, which is described by the number of antenna ports in the first dimension $N_1$, the number of antenna ports corresponding to the second dimension $N_2$ and the number of dimensions corresponding to different polarizations $M_p$. The total number of antenna ports is thus $Q = N_1 N_2 M_p$. The mapping of these ports on to the N antenna elements is an eNB implementation issue and thus not visible to the UE. The UE does not even know the value of N; it only knows the value of the number of ports Q.

Figure 6:
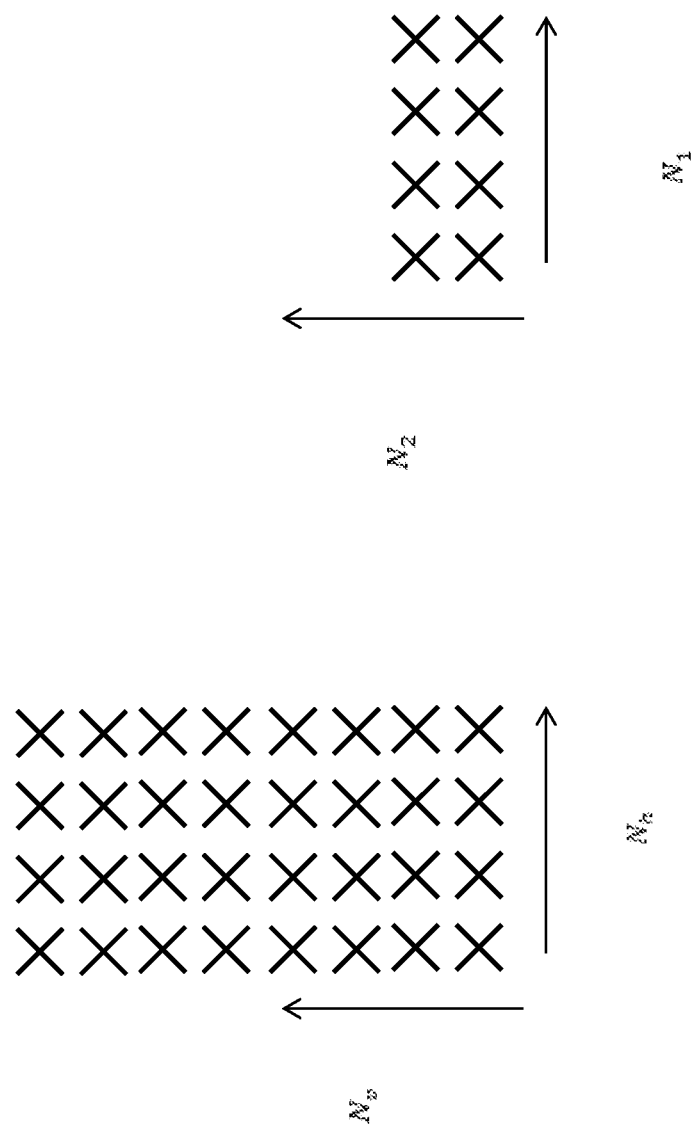
FIG. 6, showing shows an illustration of a two-dimensional antenna array.

FIG. 6 shows an illustration of a two-dimensional antenna array of cross-polarized antenna elements ($N_p$=2), with $N_h$=4 horizontal antenna elements and $N_v$=8 vertical antenna elements, and in the figure to the right, a corresponding port layout with 2 vertical ports and 4 horizontal ports. In this particular illustration, the first dimension is the horizontal dimension and the second dimension is the vertical dimension (but in other cases, the first and second dimensions may respectively correspond to vertical and horizontal dimensions). This could for instance be obtained by virtualizing each port by 4 vertical antenna elements. Hence, assuming cross-polarized ports are present, the UE may measure and/or receive from 16 antenna ports in this example.

Precoding (utilizing a precoder) may be interpreted as multiplying the signal with different beamforming weights for each antenna port prior to transmission. A typical approach is to tailor the precoder to the antenna form factor, i.e. taking into account $N_1$, $N_2$ and $M_p$ when designing the precoder codebook. A codebook may generally comprise a number of pre-defined precoders. Information about preferred MIMO/beamforming may indicate a precoder from the codebook. A memory of a UE or terminal may generally comprise or store corresponding information.

A common approach when designing precoder codebooks tailored for 2D antenna arrays is to combine precoders tailored for a horizontal array and a vertical array of antenna ports respectively by means of a Kronecker product. A precoding matrix W in the codebook may be represented as $$W = W_1 W_2 \quad \text{(Equation 1)}$$

where $W_1$ is defined as:

$$W_1 = \begin{pmatrix} X_1 \otimes X_2 & 0 \\ 0 & X_1 \otimes X_2 \end{pmatrix} \quad \text{(Equation 2)}$$

wherein
$X_1$ is a $N_1 \times L_1$ matrix (corresponding to a beam group) with $L_1$ column vectors which are constructed using $O_1$ times oversampled DFT vectors $v_i$ of length $$N_1: v_i = \begin{bmatrix} 1 & e^{\frac{j2\pi i}{N_1 O_1}} & \ldots & e^{\frac{j2\pi(N_1-1)i}{N_1 O_1}} \end{bmatrix}^t$$

$x_2$ is a $N_2 \times L_2$ matrix (corresponding to a beam group) with $L_2$ column vectors which are constructed using $O_2$ times oversampled DFT vectors $u_i$ of length $$N_2: u_i = \begin{bmatrix} 1 & e^{\frac{j2\pi i}{N_2 O_2}} & \ldots & e^{\frac{j2\pi(N_2-1)i}{N_2 O_2}} \end{bmatrix}^t$$

$N_1$ and $N_2$ are the numbers of antenna ports per polarization in 1$^{st}$ dimension and 2$^{nd}$ dimension.

$L_1$ and $L_2$ are referred to as the beam group sizes of the first and second dimensions respectively.

The matrix $W_2$ in Equation 1 selects beams from these beam groups (in the two dimensions) and $W_2$ may operate per subband, to enable fast beam selection (per subband) across the system bandwidth.

A Rel-13 Class A Codebook is discussed in the following. In Rel-13, class A CSI reporting refers to the case where the UE reports CSI using non-precoded CSI reference symbols in both the first and second dimensions. In Rel-13, parameterized codebooks for 12 and 16 ports are supported in addition to a 2-dimensional 8 port codebook. A Rel-13 class A codebook may be configured or configurable with 5 RRC configured parameters:

The numbers $N_1$, $N_2$ of antenna ports per polarization in each dimension; $N_1$, $N_2 \in \{1, 2, 3, 4, 8\}$, where the valid candidates are $(N_1, N_2)$=(8,1), (2,2), (2,3), (3,2), (2,4), (4,2)

The oversampling factors $O_1$, $O_2$ in each dimension; For each $(N_1, N_2)$, configurability of $(O_1, O_2)$ is restricted to two possible fixed pairs as given below

TABLE 1

Possible $(O_1, O_2)$ pairs for a given $(N_1, N_2)$

| $(N_1, N_2)$ | $(O_1, O_2)$ combinations |
|---|---|
| (8, 1) | (4, —), (8, —) |
| (2, 2) | (4, 4), (8, 8) |
| (2, 3) | {(8, 4), (8, 8)} |
| (3, 2) | {(8, 4), (4, 4)} |
| (2, 4) | {(8, 4), (8, 8)} |
| (4, 2) | {(8, 4), (4, 4)} |

A configuration parameter Config that can take on values of 1, 2, 3, or 4. It should be noted that for the case(s) where one dimension has a single port, the oversampling factor (for that dimension) and Config values of 2 and 3 do not apply.

A Rank 1 Class A Codebook is discussed in the following.

Given the set of values $N_1$, $N_2$, $O_1$, and $O_2$, the $W_1$ matrices in Equation 1-Equation 2 constructed with $$(L'_1, L'_2) = \begin{cases} (4, 2), & \text{if } N_1 \geq N_2 \\ (2, 4), & \text{else } N_1 < N_2 \end{cases} \quad \text{(Equation 3)}$$

where $L'_1$ and $L'_2$ are the number of columns in $X_1$ and $X_2$, respectively.

The values of $L'_1$ and $L'_2$ are first chosen such that $L'_1 > L_1$ and $L'_2 > L_2$ to form an extended codebook. Depending on the value of Config, a subset of codewords from the extended codebook is selected as an active subset (i.e. used in CSI feedback) as follows:

Config=1: $(L_1, L_2)$=(1,1)
Config=2: $(L_1, L_2)$=(2,2) [square]
Config=3: $(L_1, L_2)$=(2,2) [non-adjacent 2D beams/checkerboard]

$$\text{Config} = 4: (L_1 L_2) = \begin{cases} (4, 1), & \text{if } N_1 \geq N_2 \\ (1, 4), & \text{else } N_1 < N_2 \end{cases}$$

Hence, config 2-4 contains 4 beams per beam group while config 1 only contain a single beam per beam group. Let $i_{1,1}$=0,1, ..., $O_1 N_1/s_1-1$ and $i_{1,2}$=0, 1, ..., $O_2 N_2/s_2-1$ denote the first PMI index in dimension 1 and 2, respectively. Here, $s_1$ and $s_2$ represent beam group spacing in dimension 1 and 2, respectively. From the active subset of codewords described above, the UE selects one codeword and reports this selection via a second PMI $i'_2$ in PUSCH reporting. Hence, the rank 1 codebook can be defined in terms of $i_{1,1}$, $i_{1,2}$, and $i'_2$ as shown in Table 2 below.

TABLE 2

Rank 1 Class A Codebook for $N_1 \geq N_2$

| $i_2'$ | 0 | 1 | 2 | 3 |
|---|---|---|---|---|
| Precoder | $W_{s_1 i_{1,1}, s_2 i_{1,2}, 0}^{(1)}$ | $W_{s_1 i_{1,1}, s_2 i_{1,2}, 1}^{(1)}$ | $W_{s_1 i_{1,1}, s_2 i_{1,2}, 2}^{(1)}$ | $W_{s_1 i_{1,1}, s_2 i_{1,2}, 3}^{(1)}$ |
| $i_2'$ | 4 | 5 | 6 | 7 |
| Precoder | $W_{s_1 i_{1,1}+1, s_2 i_{1,2}, 0}^{(1)}$ | $W_{s_1 i_{1,1}+1, s_2 i_{1,2}, 1}^{(1)}$ | $W_{s_1 i_{1,1}+1, s_2 i_{1,2}, 2}^{(1)}$ | $W_{s_1 i_{1,1}+1, s_2 i_{1,2}, 3}^{(1)}$ |
| $i_2'$ | 8 | 9 | 10 | 11 |
| Precoder | $W_{s_1 i_{1,1}+2, s_2 i_{1,2}, 0}^{(1)}$ | $W_{s_1 i_{1,1}+2, s_2 i_{1,2}, 1}^{(1)}$ | $W_{s_1 i_{1,1}+2, s_2 i_{1,2}, 2}^{(1)}$ | $W_{s_1 i_{1,1}+2, s_2 i_{1,2}, 3}^{(1)}$ |
| $i_2'$ | 12 | 13 | 14 | 15 |
| Precoder | $W_{s_1 i_{1,1}+3, s_2 i_{1,2}, 0}^{(1)}$ | $W_{s_1 i_{1,1}+3, s_2 i_{1,2}, 1}^{(1)}$ | $W_{s_1 i_{1,1}+3, s_2 i_{1,2}, 2}^{(1)}$ | $W_{s_1 i_{1,1}+3, s_2 i_{1,2}, 3}^{(1)}$ |
| $i_2'$ | 16-31 | | | |
| Precoder | Entries 16-31 constructed with replacing the second subscript $s_2 i_{1,2}$ with $s_2 i_{1,2}+1$ in entries 0-15. | | | |

In Table 2, the selected rank-1 codeword $W_{m_1,m_2,n}^{(1)}$ is defined as $$W_{m_1,m_2,n}^{(1)} = \frac{1}{\sqrt{Q}} \begin{bmatrix} v_{m_1} \otimes u_{m_2} \\ \varphi_n v_{m_1} \otimes u_{m_2} \end{bmatrix} \quad \text{(Equation 4)}$$

wherein $\varphi_n = e^{j\pi n/2}$. In Equation 4, the single layer of data is transmitted on the 2-dimensional beam involving the $m_1^{th}$ beam in the first dimension and the $m_2^{th}$ beam in the second dimension where $$v_{m_1} = \begin{bmatrix} 1 & e^{j\frac{2\pi m_1}{O_1 N_1}} & \cdots & e^{j\frac{2\pi m_1(N_1-1)}{O_1 N_1}} \end{bmatrix}^T \quad \text{(Equation 5)}$$

$$u_{m_2} = \begin{bmatrix} 1 & e^{j\frac{2\pi m_2}{O_2 N_2}} & \cdots & e^{j\frac{2\pi m_2(N_2-1)}{O_2 N_2}} \end{bmatrix}^t \quad \text{(Equation 6)}$$

For each Config value, the different possible values of $i'_2$ and the associated values of $s_1$ and $s_2$ are illustrated in FIG. 15.

This codebook can be interpreted as follows: The left column in Table 2 describes how the beams in the beam group are distributed across the first and second dimension. The indices $i_{1,1}$ and $i_{1,2}$ in Table 1 are wideband, and used to select the beams in the beam group. The index $i'_2$ is used to perform beam selection within the beam group (as selected by $i_{1,1}$ and $i_{1,2}$) and co-phasing of the beams in the different polarizations. The parameters $s_1$ and $s_2$ indicates the shift between different beam groups. For instance, Table 1 shows that given $i_{1,1}$, the indices for the first dimension are $s_1 i_{1,1}$, $s_1 i_{1,1}+1$, $s_1 i_{1,1}+2$, $s_1 i_{1,1}+3$ while Table 2 shows that for Config 2, only $i'_2$ indices (0-7,16-23) can be selected, hence only $s_1 i_{1,1}$, $s_1 i_{1,1}+1$ can be selected for this configuration. Effectively, the beam group size of the first dimension in Config 2 is two, i.e. $L_1=2$.

A Rank 2 Class A Codebook is discussed in the following.

Given the set of values $N_1$, $N_2$, $O_1$, and $O_2$, the $W_1$ matrices in Equation 1—Equation 2 are constructed similar to the above (i.e., using the same values of $(L'_1, L'_2)$ defined in Equation 3. The rank 2 codebook can be defined in terms of $i_{1,1}$, $i_{1,2}$, and $i'_2$ as shown in Table 3 below (See [4] for further details). Here, $i_{1,1}$ and $i_{1,2}$ denote the first PMI index in dimension 1 and 2, respectively. In Table 3, the selected rank-2 codeword $W_{m_1,m_2,m'_1,m'_2,n}^{(2)}$ is defined as $$W_{m_1,m_2,m'_1,m'_2,n}^{(2)} = \frac{1}{\sqrt{2Q}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix} \quad \text{(Equation 7)}$$

Wherein $\varphi_n = e^{j\pi n/2}$. In equation 7, the first layer of data is transmitted on the 2-dimensional beam involving the $m_1^{th}$ beam in the first dimension and the $m_2^{th}$ beam in the second dimension; the second layer of data is transmitted on the 2-dimensional beam involving the $(m_1')^{th}$ beam in the first dimension and the $(m_2')^{th}$ beam in the second dimension. Furthermore, $i_{1,1}$, $i_{1,2}$, $p_1$, and $p_2$ in Table 3 are defined as:

$i_{1,1}=0,1,\ldots,O_1 N_1/s_1-1$ $i_{1,2}=0,1,\ldots,O_2 N_2/s_2-1$ $p_1=1$ and $p_2=1$

TABLE 3

Rank 2 Class A Codebook

| $i_2'$ | 0 | 1 |
|---|---|---|
| Precoder | $W_{s_1 i_{1,1}, s_2 i_{1,2}, s_1 i_{1,1}, s_2 i_{1,2}, 0}^{(2)}$ | $W_{s_1 i_{1,1}, s_2 i_{1,2}, s_1 i_{1,1}, s_2 i_{1,2}, 1}^{(2)}$ |
| $i_2'$ | 4 | 5 |
| $i_{1,1}, i_{1,2}$ | $W_{s_1 i_{1,1}+2p_1, s_2 i_{1,2}, s_1 i_{1,1}+2p_1, s_2 i_{1,2}, 0}^{(2)}$ | $W_{s_1 i_{1,1}+2p_1, s_2 i_{1,2}, s_1 i_{1,1}+2p_1, s_2 i_{1,2}, 2}^{(2)}$ |
| $i_2'$ | 8 | 9 |
| $i_{1,1}, i_{1,2}$ | $W_{s_1 i_{1,1}, s_2 i_{1,2}, s_1 i_{1,2}+p_1, s_2 i_{1,2}, 0}^{(2)}$ | $W_{s_1 i_{1,1}, s_2 i_{1,2}, s_1 i_{1,1}+p_1, s_2 i_{1,2}, 1}^{(2)}$ |

TABLE 3-continued

Rank 2 Class A Codebook

| $i_2'$ | 12 | 13 |
|---|---|---|
| $i_{1,1}, i_{1,2}$ | $W^{(2)}_{s_1 i_{1,1}, s_2 i_{1,2}, s_1 i_1+3p_1, s_2 i_{1,2}, 0}$ | $W^{(2)}_{s_1 i_{1,1}, s_2 i_{1,2}, s_1 i_1+3p_1, s_2 i_{1,2},}$ |
| $i_2'$ | 16 | 17 |
| $i_{1,1}, i_{1,2}$ | $W^{(2)}_{s_1 i_{1,1}, s_2 i_{1,2}+p_2, s_1 i_{1,1}, s_2 i_{1,2}+p_2, 0}$ | $W^{(2)}_{s_1 i_{1,1}, s_2 i_{1,2}+p_2, s_1 i_{1,1}, s_2 i_{1,2}+p_2}$ |
| $i_2'$ | 20 | 21 |
| $i_{1,1}, i_{1,2}$ | $W^{(2)}_{s_1 i_{1,1}+3p_1, s_2 i_{1,2}+p_2, s_1 i_{1,1}+3p_1, s_2 i_{1,2}+p_2, 0}$ | $W^{(2)}_{s_1 i_{1,1}+3p_1, s_2 i_{1,2}+p_2, s_1 i_{1,1}+3p_1, s_2 i_{1,2}+p}$ |
| $i_2'$ | 24 | 25 |
| $i_{1,1}, i_{1,2}$ | $W^{(2)}_{s_1 i_{1,1}+p_1, s_2 i_{1,2}+p_2, s_1 i_{1,1}+2p_1, s_2 i_{1,2}+p_2, 0}$ | $W^{(2)}_{s_1 i_{1,1}+p_1, s_2 i_{1,2}+p_2, s_1 i_{1,1}+2p_1, s_2 i_{1,2}+p}$ |
| $i_2'$ | 28 | 29 |
| $i_{1,1}, i_{1,2}$ | $W^{(2)}_{s_1 i_{1,1}, s_2 i_{1,2}, s_1 i_{1,1}, s_2 i_{1,2}+p_2, 0}$ | $W^{(2)}_{s_1 i_{1,1}, s_2 i_{1,2}, s_1 i_{1,1}, s_2 i_{1,2}+p_2, 1}$ |
| $i_2'$ | 2 | 3 |
| Precoder | $W^{(2)}_{s_1 i_{1,1}+p_1, s_2 i_{1,2}, s_1 i_{1,1}+p_1, s_2 i_{1,2}, 0}$ | $W^{(2)}_{s_1 i_{1,1}+p_1, s_2 i_{1,2}, s_1 i_{1,1}+p_1, s_2 i_{1,2}, 1}$ |
| $i_2'$ | 6 | 7 |
| $i_{1,1}, i_{1,2}$ | $W^{(2)}_{s_1 i_{1,1}+3p_1, s_2 i_{1,2}, s_1 i_{1,1}+3p_1, s_2 i_{1,2}}$ | $W^{(2)}_{s_1 i_{1,1}+3p_1, s_2 i_{1,2}, s_1 i_{1,1}+3p_1, s_2 i_{1,2}}$ |
| $i_2'$ | 10 | 11 |
| $i_{1,1}, i_{1,2}$ | $W^{(2)}_{s_1 i_{1,1}+p_1, s_2 i_{1,2}, s_1 i_{1,1}+2p_1, s_2 i_{1,2}, 0}$ | $W^{(2)}_{s_1 i_{1,1}+p_1, s_2 i_{1,2}, s_1 i_{1,1}+2p_1, s_2 i_{1,2},}$ |
| $i_2'$ | 14 | 15 |
| $i_{1,1}, i_{1,2}$ | $W^{(2)}_{s_1 i_{1,1}+p_1, s_2 i_{1,2}, s_1 i_{1,1}+3p_1, s_2 i_{1,2}, 0}$ | $W^{(2)}_{s_1 i_{1,1}+p_1, s_2 i_{1,2}, s_1 i_{1,1}+3p_1, s_2 i_{1,2}, 1}$ |
| $i_2'$ | 18 | 19 |
| $i_{1,1}, i_{1,2}$ | $W^{(2)}_{s_1 i_{1,1}+p_1, s_2 i_{1,2}+p_2, s_1 i_{1,1}+p_1, s_2 i_{1,2}+p_2, 0}$ | $W^{(2)}_{s_1 i_{1,1}+p_1, s_2 i_{1,2}+p_2, s_1 i_{1,1}+p_1, s_2 i_{1,2}+p_2, 1}$ |
| $i_2'$ | 22 | 23 |
| $i_{1,1}, i_{1,2}$ | $W^{(2)}_{s_1 i_{1,1}, s_2 i_{1,2}+p_2, s_1 i_{1,1}+p_1, s_2 i_{1,2}+p_2, 0}$ | $W^{(2)}_{s_1 i_{1,1}, s_2 i_{1,2}+p_2, s_1 i_{1,1}+p_1, s_2 i_{1,2}+p_2, 1}$ |
| $i_2'$ | 26 | 27 |
| $i_{1,1}, i_{1,2}$ | $W^{(2)}_{s_1 i_{1,1}+p_1, s_2 i_{1,2}+p_2, s_1 i_{1,1}+3p_1, s_2 i_{1,2}+p_2, 0}$ | $W^{(2)}_{s_1 i_{1,1}+p_1, s_2 i_{1,2}+p_2, s_1 i_{1,1}+3p_1, s_2 i_{1,2}+p_2, 1}$ |
| $i_2'$ | 30 | 31 |
| $i_{1,1}, i_{1,2}$ | $W^{(2)}_{s_1 i_{1,1}+p_1, s_2 i_{1,2}, s_1 i_{1,1}+p_1, s_1 i_{1,2}+p_2, 0}$ | $W^{(2)}_{s_1 i_{1,1}+p_1, s_2 i_{1,2}, s_1 i_{1,1}+p_1, s_1 i_{1,2}+p_2, 1}$ |

For each Config value, the different possible values of $i_2'$ and the associated values of $s_1$ and $s_2$ corresponding to the rank-2 Class A codebook are given in FIG. 16. In Figure. 16, 2-dimensional beams are indicated by square shaped boxes. A square box with indices a'b' in the first dimension and indices c'd' in the second dimension corresponds to any codeword from FIG. 16 that satisfies the conditions $m_1 = s_1 i_{1,1} + a'$, $m_2 = s_2 i_{1,2} + c'$, $m'_1 = s_1 i_{1,1} + b'$, and $m'_2 = s_2 i_{1,2} + d'$. For each Config, the shaded, dashed and crossed boxes represent the 2-dimensional beams that can be used to form the active subset of codewords from the extended codebook table (See FIG. 16 for a discussion on the extended codebook table).

A Rank 3 Class A Codebook is discussed below.

The rank 3 codebook can be defined in terms of four parameters: $i_{1,1}$, $i_{1,2}$, k and $i_2'$ (See [7] for further details). Here, $i_{1,1}$ and $i_{1,2}$ denote the first PMI index in dimension 1 and 2, respectively. The different parameter values of parameter k represent different orthogonal beam groups. Each beam group consists of $L'_1$ beams in the first dimension and $L'_2$ beams in the second dimension where $(L'_1, L'_2)$ are defined in Equation 3. During feedback, the UE feeds back k as part of the $W_1$ indication. Each k value corresponds to one pair of $(\delta_1, \delta_2)$ parameters as shown in Table 4. There can be two alternatives for the maximum value of k:

Alt 1. Two values: k=0,1 in Table 4
Alt 2. Maximum eight values:
If $N_1 > 1$ and $N_2 > 1$: k=0, 1, 2 . . . , 7 in Table 4
If $N_2 = 1$: k=0, 1, 2 in Table 4

TABLE 4

Mapping between k and $(\delta_1, \delta_2)$

| | | k | | | | | | | |
|---|---|---|---|---|---|---|---|---|---|
| | $\delta$ | 0 | 1 | 2 | 3 | 4 | 5 | 6 | 7 |
| If $N_1 > 1$ and $N_2 > 1$ | $\delta_1$ | $O_1$ | 0 | $O_1$ | $2O_1$ | 0 | $O_1$ | $2O_1$ | $2O_1$ |
| | $\delta_2$ | 0 | $O_2$ | $O_2$ | 0 | $2O_2$ | $2O_2$ | $O_2$ | $2O_2$ |
| If $N_2 = 1$ | $\delta_1$ | $O_1$ | $2O_1$ | $3O_1$ | | | | | |
| | $\delta_2$ | 0 | 0 | 0 | | | | | |

Furthermore, $i_{1,1}$ and $i_{1,2}$, are defined as:

$$i_{1,1} = 0, 1, \ldots, O_1 N_1/s_1 - 1$$

$$i_{1,2} = 0, 1, \ldots, O_2 N_2/s_2 - 1$$

Then, the rank 3 codebook can be defined as shown in Table 5. In Table 5, $W^{(3)}_{m_1, m_1', m_2, m_2'}$ and $\tilde{W}^{(3)}_{m_1, m_1', m_2, m_2'}$ are defined as $$W^{(3)}_{m_1, m_1', m_2, m_2'} = \frac{1}{\sqrt{3Q}} \begin{bmatrix} v_{m_1} \otimes u_{m_2} & v_{m_1} \otimes u_{m_2} & v_{m_1'} \otimes u_{m_2'} \\ v_{m_1} \otimes u_{m_2} & -v_{m_1} \otimes u_{m_2} & v_{m_1'} \otimes u_{m_2'} \end{bmatrix} \quad \text{(Equation 8)}$$

$$\tilde{W}^{(3)}_{m_1, m_1', m_2, m_2'} = \frac{1}{\sqrt{3Q}} \begin{bmatrix} v_{m_1} \otimes u_{m_2} & v_{m_1'} \otimes u_{m_2'} & v_{m_1'} \otimes u_{m_2'} \\ v_{m_1} \otimes u_{m_2} & v_{m_1'} \otimes u_{m_2'} & -v_{m_1'} \otimes u_{m_2'} \end{bmatrix} \quad \text{(Equation 9)}$$

For each Config value, the different possible values of $i'_2$ and the associated values of $(s_1, s_2)$ and $(p_1, p_2)$ corresponding to the rank-3 class A codebook are given in Table 6.

TABLE 6

Selection of $i'_2$, $(s_1, s_2)$, and $(p_1, p_2)$ for Rank-3 Class A Codebook

| Config | Selected $i'_2$ indices | $(s_1, s_2)$ | $(p_1, p_2)$ |
|---|---|---|---|
| 1 | 0, 2 | (1, 1) | (—, —) |
| 2 | 0-7, 16-23 | $(O_1, O_2)$ | $\left(\frac{O_1}{2}, \frac{O_2}{2}\right)$ |
| 3 | 0-3, 8-11, 20-23, 28-31 | $(O_1, O_2)$ | $\left(\frac{O_1}{4}, \frac{O_2}{2}\right)$ |
| 4 | 0-15 | $\left(O_1, \frac{O_2}{2}\right)$ | $\left(\frac{O_1}{4}, -\right)$ |

A Rank 4 Class A Codebook is discussed in the following.

The rank 4 codebook can be defined in terms of four parameters: $i_{1,1}$, $i_{1,2}$, $k$ and $i'_2$ (See [7] for further details). Here, $i_{1,1}$ and $i_{1,2}$ denote the first PMI index in dimension 1 and 2, respectively. The different parameter values of parameter $k$ represent different orthogonal beam groups. Each beam group consists of $L'_1$ beams in the first dimension and $L'_2$ beams in the second dimension where $(L'_1, L'_2)$ are defined in Equation 3. During feedback, the UE feeds back $k$ as part of the $W_1$ indication. Each $k$ value corresponds to one pair of $(\delta_1, \delta_2)$ parameters as shown in Table 4.

There can be two alternatives for the maximum value of $k$:

TABLE 5

Rank 3 Class A Codebook

| $i'_2$ | 0 | 1 |
|---|---|---|
| $i_{1,1}, i_{1,2}, k$ | $W^{(3)}_{s_1 i_{1,1}, s_1 i_{1,1}+\delta_1, s_2 i_{1,2}, s_2 i_{1,2}+\delta_2}$ | $W^{(3)}_{s_1 i_{1,1}+\delta_1, s_1 i_{1,1}, s_2 i_{1,2}+\delta_2, s_2 i_{1,2}}$ |
| $i'_2$ | 4 | 5 |
| $i_{1,1}, i_{1,2}, k$ | $W^{(3)}_{s_1 i_{1,1}+p_1, s_1 i_{1,1}+p_1+\delta_1, s_2 i_{1,2}, s_2 i_{1,2}+\delta_2}$ | $W^{(3)}_{s_1 i_{1,1}+p_1+\delta_1, s_1 i_{1,1}+p_1, s_2 i_{1,2}+\delta_2, s_2 i_{1,2}}$ |
| $i'_2$ | 8 | 9 |
| $i_{1,1}, i_{1,2}, k$ | $W^{(3)}_{s_1 i_{1,1}+2p_1, s_1 i_{1,1}+2p_1+\delta_1, s_2 i_{1,2}, s_2 i_{1,2}+\delta_2}$ | $W^{(3)}_{s_1 i_{1,1}+2p_1+\delta_1, s_1 i_{1,1}+2p_1, s_2 i_{1,2}+\delta_2, s_2 i_{1,2}}$ |
| $i'_2$ | 12 | 13 |
| $i_{1,1}, i_{1,2}, k$ | $W^{(3)}_{s_1 i_{1,1}+3p_1, s_1 i_{1,1}+3p_1+\delta_1, s_2 i_{1,2}, s_2 i_{1,2}+\delta_2}$ | $W^{(3)}_{s_1 i_{1,1}+3p_1+\delta_1, s_1 i_{1,1}+3p_1, s_2 i_{1,2}+\delta_2, s_2 i_{1,2}}$ |
| $i'_2$ | 16-31 | |
| $i_{1,1}, i_{1,2}, k$ | Entries 16-31 constructed with replacing $s_2 i_{1,2}$ in third and fourth subscripts with $s_2 i_{1,2} + p_2$ in entries 0-15. | |
| $i'_2$ | 2 | 3 |
| $i_{1,1}, i_{1,2}, k$ | $\tilde{W}^{(3)}_{s_1 i_{1,1}, s_1 i_{1,1}+\delta_1, s_2 i_{1,2}, s_2 i_{1,2}+\delta_2}$ | $\tilde{W}^{(3)}_{s_1 i_{1,1}+\delta_1, s_1 i_{1,1}, s_2 i_{1,2}+\delta_2, s_2 i_{1,2}}$ |
| $i'_2$ | 6 | 7 |
| $i_{1,1}, i_{1,2}, k$ | $\tilde{W}^{(3)}_{s_1 i_{1,1}+p_1, s_1 i_{1,1}+p_1+\delta_1, s_2 i_{1,2}, s_2 i_{1,2}+\delta_2}$ | $\tilde{W}^{(3)}_{s_1 i_{1,1}+p_1+\delta_1, s_1 i_{1,1}+p_1, s_2 i_{1,2}+\delta_2, s_2 i_{1,2}}$ |
| $i'_2$ | 10 | 11 |
| $i_{1,1}, i_{1,2}, k$ | $\tilde{W}^{(3)}_{s_1 i_{1,1}+2p_1, s_1 i_{1,1}+2p_1+\delta_1, s_2 i_{1,2}, s_2 i_{1,2}+\delta_2}$ | $\tilde{W}^{(3)}_{s_1 i_{1,1}+2p_1+\delta_1, s_1 i_{1,1}+2p_1, s_2 i_{1,2}+\delta_2, s_2 i_{1,2}}$ |
| $i'_2$ | 14 | 15 |
| $i_{1,1}, i_{1,2}, k$ | $\tilde{W}^{(3)}_{s_1 i_{1,1}+3p_1, s_1 i_{1,1}+3p_1+\delta_1, s_2 i_{1,2}, s_2 i_{1,2}+\delta_2}$ | $\tilde{W}^{(3)}_{s_1 i_{1,1}+3p_1+\delta_1, s_1 i_{1,1}+3p_1, s_2 i_{1,2}+\delta_2, s_2 i_{1,2}}$ |
| $i'_2$ | 16-31 | |
| $i_{1,1}, i_{1,2}, k$ | Entries 16-31 constructed with replacing $s_2 i_{1,2}$ in third and fourth subscripts with $s_2 i_{1,2} + p_2$ in entries 0-15. | |

Alt 1. Two values: k=0,1 in Table 4
Alt 2. Maximum eight values:
   If $N_1>1$ and $N_2>1$: k=0, 1, 2 . . . , 7 in Table 4
   If $N_2=1$: k=0, 1, 2 in Table 4
Furthermore, $i_{1,1}$ and $i_{1,2}$ are defined as:

$$i_{1,1}=0,1,\ldots,O_1N_1/s_1-1$$

$$i_{1,2}=0,1,\ldots,O_2N_2/s_2-1$$

Then, the rank 4 codebook can be defined as shown in Table 7. In Table 7, $W_{m_1,m_1',m_2,m_2'}^{(4)}$ is defined as $$W_{m_1,m_1',m_2,m_2'n}^{(4)} = \frac{1}{\sqrt{4Q}}$$ (Equation 10)

$$\begin{bmatrix} v_{m_1}\otimes u_{m_2} & v_{m_1'}\otimes u_{m_2'} & v_{m_1}\otimes u_{m_2} & v_{m_1'}\otimes u_{m_2'} \\ \varphi_n v_{m_1}\otimes u_{m_2} & \varphi_n v_{m_1'}\otimes u_{m_2'} & -\varphi_n v_{m_1}\otimes u_{m_2} & -v_{m_1'}\otimes u_{m_2'} \end{bmatrix}$$

For each Config value, the different possible values of $i'_2$ and the associated values of $(s_1,s_2)$ and $(p_1, p_2)$ corresponding to the rank-4 class A codebook are given in Table 8.

Ranks 5-8 Class A Codebooks is discussed in the following.

For ranks 5-8, the Class A codebooks are defined by two parameters: $\{i_{11}, i_{12}\}$ (See [7] for further details). Here, $i_{1,1}$ and $i_{1,2}$ denote the first PMI index in dimension 1 and 2, respectively. The $i_{1,1}$ and $i_{1,2}$ parameters are defined as:

$$i_{1,1}=0,1,\ldots,O_1N_1/s_1-1$$

$$i_{1,2}=0,1,\ldots,O_2N_2/s_2-1$$

TABLE 7

Rank 4 Class A Codebook

| $i_2'$ | 0 | 1 |
|---|---|---|
| $i_{1,1}, i_{1,2}, k$ | $W_{s_1 i_{1,1}, s_1 i_{1,1}+\delta_1, s_2 i_{1,2}, s_2 i_{1,2}+\delta_2, 0}^{(4)}$ | $W_{s_1 i_{1,1}, s_1 i_{1,1}+\delta_1, s_2 i_{1,2}, s_2 i_{1,2}+\delta_2, 1}^{(4)}$ |
| $i_2'$ | 4 | 5 |
| $i_{1,1}, i_{1,2}, k$ | $W_{s_1 i_{1,1}+2p_1, s_1 i_{1,1}+2p_1+\delta_1, s_2 i_{1,2}, s_2 i_{1,2}+\delta_2}^{(4)}$ | $W_{s_1 i_{1,1}+2p_1, s_1 i_{1,1}+2p_1+\delta_1, s_2 i_{1,2}, s_2 i_{1,2}+\delta_2, 1}^{(4)}$ |
| $i_2'$ | 8-15 | |
| $i_{1,1}, i_{1,2}, k$ | Entries 8-15 constructed with replacing $s_2 i_{1,2}$ in third and fourth subscripts with $s_2 i_{1,2} + p_2$ in entries 0-7. | |
| $i_2'$ | 2 | 3 |
| $i_{1,1}, i_{1,2}, k$ | $W_{s_1 i_{1,1}+p_1, s_1 i_{1,1}+p_1+\delta_1, s_2 i_{1,2}, s_2 i_{1,2}+\delta_2, 0}^{(4)}$ | $W_{s_1 i_{1,1}+p_1, s_1 i_{1,1}+p_1+\delta_1, s_2 i_{1,2}, s_2 i_{1,2}+\delta_2, 1}^{(4)}$ |
| $i_2'$ | 6 | 7 |
| $i_{1,1}, i_{1,2}, k$ | $W_{s_1 i_{1,1}+3p_1, s_1 i_{1,1}+3p_1+\delta_1, s_2 i_{1,2}, s_2 i_{1,2}+\delta_2, 0}^{(4)}$ | $W_{s_1 i_{1,1}+3p_1, s_1 i_{1,1}+3p_1+\delta_1, s_2 i_{1,2}, s_2 i_{1,2}+\delta_2, 1}^{(4)}$ |
| $i_2'$ | 8-15 | |
| $i_{1,1}, i_{1,2}, k$ | Entries 8-15 constructed with replacing $s_2 i_{1,2}$ in third and fourth subscripts with $s_2 i_{1,2} + p_2$ in entries 0-7. | |

TABLE 8

Selection of $i'_2$, $(s_1, s_2)$, and $(p_1, p_2)$ for Rank-4 Class A Codebook

| Config | Selected $i'_2$ indices | $(s_1, s_2)$ | $(p_1, p_2)$ |
|---|---|---|---|
| 1 | 0, 1 | (1, 1) | (—, —) |
| 2 | 0-3, 8-11 | $(O_1, O_2)$ | $\left(\frac{O_1}{2}, \frac{O_2}{2}\right)$ |
| 3 | 0-1, 4-5, 10-11, 14-15 | $(O_1, O_2)$ | $\left(\frac{O_1}{4}, \frac{O_2}{2}\right)$ |
| 4 | 0-7 | $\left(O_1, \frac{O_2}{2}\right)$ | $\left(\frac{O_1}{4}, -\right)$ |

For a given Config, $(s_1, s_2)$ values are determined similar to Table 8. A precoding matrix codeword for rank r (r=5, 6, 7, 8) is denoted as $W_{i_{1,1},i_{1,2}}^{(r)}$. The precoding matrix codewords $W_{i_{1,1},i_{1,2}}^{(r)}$, r=5, 6, 7, 8 are then defined as $$W^{(5)}_{i_{1,1},i_{1,2}} = \frac{1}{\sqrt{5Q}} \times \begin{bmatrix} v_{s_1 i_{1,1}} \otimes & v_{s_1 i_{1,1}} \otimes & v_{s_1 i_{1,1}+\delta_{1,1}} \otimes & v_{s_1 i_{1,1}+\delta_{1,1}} \otimes & v_{s_1 i_{1,1}+\delta_{1,2}} \otimes \\ u_{s_2 i_{1,2}} & u_{s_2 i_{1,2}} & u_{s_2 i_{1,2}+\delta_{2,1}} & u_{s_2 i_{1,2}+\delta_{2,1}} & u_{s_2 i_{1,2}+\delta_{2,2}} \\ v_{s_1 i_{1,1}} \otimes & -v_{s_1 i_{1,1}} \otimes & v_{s_1 i_{1,1}+\delta_{1,1}} \otimes & -v_{s_1 i_{1,1}+\delta_{1,1}} \otimes & v_{s_1 i_{1,1}+\delta_{1,2}} \otimes \\ u_{s_2 i_{1,2}} & u_{s_2 i_{1,2}} & u_{s_2 i_{1,2}+\delta_{2,1}} & u_{s_2 i_{1,2}+\delta_{2,1}} & u_{s_2 i_{1,2}+\delta_{2,2}} \end{bmatrix}$$
(Equation 11)

$$W^{(6)}_{i_{1,1},i_{1,2}} = \frac{1}{\sqrt{6Q}} \times \begin{bmatrix} v_{s_1 i_{1,1}} \otimes & v_{s_1 i_{1,1}} \otimes & v_{s_1 i_{1,1}+\delta_{1,1}} \otimes & v_{s_1 i_{1,1}+\delta_{1,1}} \otimes & v_{s_1 i_{1,1}+\delta_{1,2}} \otimes & v_{s_1 i_{1,1}+\delta_{1,2}} \otimes \\ u_{s_2 i_{1,2}} & u_{s_2 i_{1,2}} & u_{s_2 i_{1,2}+\delta_{2,1}} & u_{s_2 i_{1,2}+\delta_{2,1}} & u_{s_2 i_{1,2}+\delta_{2,2}} & u_{s_2 i_{1,2}+\delta_{2,2}} \\ v_{s_1 i_{1,1}} \otimes & -v_{s_1 i_{1,1}} \otimes & v_{s_1 i_{1,1}+\delta_{1,1}} \otimes & -v_{s_1 i_{1,1}+\delta_{1,1}} \otimes & v_{s_1 i_{1,1}+\delta_{1,2}} \otimes & -v_{s_1 i_{1,1}+\delta_{1,2}} \otimes \\ u_{s_2 i_{1,2}} & u_{s_2 i_{1,2}} & u_{s_2 i_{1,2}+\delta_{2,1}} & u_{s_2 i_{1,2}+\delta_{2,1}} & u_{s_2 i_{1,2}+\delta_{2,2}} & u_{s_2 i_{1,2}+\delta_{2,2}} \end{bmatrix}$$
(Equation 12)

$$W^{(7)}_{i_{1,1},i_{1,2}} = \frac{1}{\sqrt{7Q}} \times \begin{bmatrix} v_{s_1 i_{1,1}} \otimes & v_{s_1 i_{1,1}} \otimes & v_{s_1 i_{1,1}+\delta_{1,1}} \otimes & v_{s_1 i_{1,1}+\delta_{1,1}} \otimes & v_{s_1 i_{1,1}+\delta_{1,2}} \otimes & v_{s_1 i_{1,1}+\delta_{1,2}} \otimes & v_{s_1 i_{1,1}+\delta_{1,3}} \otimes \\ u_{s_2 i_{1,2}} & u_{s_2 i_{1,2}} & u_{s_2 i_{1,2}+\delta_{2,1}} & u_{s_2 i_{1,2}+\delta_{2,1}} & u_{s_2 i_{1,2}+\delta_{2,2}} & u_{s_2 i_{1,2}+\delta_{2,2}} & u_{s_2 i_{1,2}+\delta_{2,3}} \\ v_{s_1 i_{1,1}} \otimes & -v_{s_1 i_{1,1}} \otimes & v_{s_1 i_{1,1}+\delta_{1,1}} \otimes & -v_{s_1 i_{1,1}+\delta_{1,1}} \otimes & v_{s_1 i_{1,1}+\delta_{1,2}} \otimes & -v_{s_1 i_{1,1}+\delta_{1,2}} \otimes & v_{s_1 i_{1,1}+\delta_{1,3}} \otimes \\ u_{s_2 i_{1,2}} & u_{s_2 i_{1,2}} & u_{s_2 i_{1,2}+\delta_{2,1}} & u_{s_2 i_{1,2}+\delta_{2,1}} & u_{s_2 i_{1,2}+\delta_{2,2}} & u_{s_2 i_{1,2}+\delta_{2,2}} & u_{s_2 i_{1,2}+\delta_{2,3}} \end{bmatrix}$$
(Equation 13)

$$W^{(8)}_{i_{1,1},i_{1,2}} = \frac{1}{\sqrt{8Q}} \times$$
(Equation 14)

$$\begin{bmatrix} v_{s_1 i_{1,1}} \otimes & v_{s_1 i_{1,1}} \otimes & v_{s_1 i_{1,1}+\delta_{1,1}} \otimes & v_{s_1 i_{1,1}+\delta_{1,1}} \otimes & v_{s_1 i_{1,1}+\delta_{1,2}} \otimes & v_{s_1 i_{1,1}+\delta_{1,2}} \otimes & v_{s_1 i_{1,1}+\delta_{1,3}} \otimes & v_{s_1 i_{1,1}+\delta_{1,3}} \otimes \\ u_{s_2 i_{1,2}} & u_{s_2 i_{1,2}} & u_{s_2 i_{1,2}+\delta_{2,1}} & u_{s_2 i_{1,2}+\delta_{2,1}} & u_{s_2 i_{1,2}+\delta_{2,2}} & u_{s_2 i_{1,2}+\delta_{2,2}} & u_{s_2 i_{1,2}+\delta_{2,3}} & u_{s_2 i_{1,2}+\delta_{2,3}} \\ v_{s_1 i_{1,1}} \otimes & -v_{s_1 i_{1,1}} \otimes & v_{s_1 i_{1,1}+\delta_{1,1}} \otimes & -v_{s_1 i_{1,1}+\delta_{1,1}} \otimes & v_{s_1 i_{1,1}+\delta_{1,2}} \otimes & -v_{s_1 i_{1,1}+\delta_{1,2}} \otimes & v_{s_1 i_{1,1}+\delta_{1,3}} \otimes & -v_{s_1 i_{1,1}+\delta_{1,3}} \otimes \\ u_{s_2 i_{1,2}} & u_{s_2 i_{1,2}} & u_{s_2 i_{1,2}+\delta_{2,1}} & u_{s_2 i_{1,2}+\delta_{2,1}} & u_{s_2 i_{1,2}+\delta_{2,2}} & u_{s_2 i_{1,2}+\delta_{2,2}} & u_{s_2 i_{1,2}+\delta_{2,3}} & u_{s_2 i_{1,2}+\delta_{2,3}} \end{bmatrix}$$

For 16 ports (i.e., $N_1 N_2 = 8$), $\delta_{1,1}$, $\delta_{1,2}$, $\delta_{1,3}$, $\delta_{2,1}$, $\delta_{2,2}$, $\delta_{2,3}$ are defined as in Table 9. For 12 ports (i.e., $N_1 N_2 = 6$), $\delta_{1,1}$, $\delta_{1,2}$, $\delta_{1,3}$, $\delta_{2,1}$, $\delta_{2,2}$, $\delta_{2,3}$ are defined as in Table 10.

TABLE 9

Delta values for cases with 16 ports and ranks 5-8

| | Antenna configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| Config = 4 | $N_1 \geq N_2$ | $O_1$ | 0 | $2O_1$ | 0 | $3O_1$ | 0 |
| | $N_1 < N_2$ | 0 | $O_2$ | 0 | $2O_2$ | 0 | $3O_2$ |
| Config = 3 | $N_1 \geq N_2$ | $O_1$ | 0 | $2O_1$ | $O_2$ | $3O_1$ | $O_2$ |
| | $N_1 < N_2$ | 0 | $O_2$ | $O_1$ | $2O_2$ | $O_1$ | $3O_2$ |
| Config = 2 | Both | $O_1$ | 0 | $O_1$ | $O_2$ | 0 | $O_2$ |

TABLE 10

Delta values for cases with 12 ports and ranks 5-8

| | Antenna configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| Config = 4 | $N_1 \geq N_2$ | $O_1$ | 0 | $2O_1$ | 0 | 0 | $O_2$ |
| | $N_1 < N_2$ | 0 | $O_2$ | 0 | $2O_2$ | $O_1$ | 0 |
| Config = 3 | $N_1 \geq N_2$ | $O_1$ | 0 | $O_1$ | $O_2$ | $2O_1$ | $O_2$ |
| | $N_1 < N_2$ | 0 | $O_2$ | $O_1$ | $O_2$ | $O_1$ | $2O_2$ |
| Config = 2 | Both | $O_1$ | 0 | $O_1$ | $O_2$ | 0 | $O_2$ |

Generally, in many practical deployments the vertical PMI varies much slower than the horizontal PMI. This is due to the higher angular spreads associated with the channel in the horizontal dimension when compared to the angular spreads in the vertical dimension. Therefore, from the perspective of reducing the feedback overhead on PUCCH, it is desirable that the vertical PMI and the horizontal PMI are separately reported with different feedback periods during periodic CSI feedback.

The Rel-13 class A codebook described herein utilizes a first PMI index in dimensions 1 and 2 which are denoted by $i_{1,1}$ and $i_{1,2}$, respectively. However, the UE does not know which of the two dimensions is slowly varying and which one is more frequently varying. Stated differently, the UE does not know which one of $i_{1,1}$ and $i_{1,2}$ represents the horizontal PMI, and which one represents the vertical PMI. In order to separately report the slowly varying PMI and the more frequently varying PMI with different periodicities, it is a problem how to identify the dimension corresponding to the slowly varying PMI and the dimension corresponding to the more frequently varying PMI at the UE. Since the Rel-13 class A codebook is configurable (via the 5 RRC configured parameters described herein), it is also a problem how to do this identification in a configurable manner.

As described herein, the orthogonal beam group parameter k is only relevant to the class A codebooks corresponding to ranks 3-4. Since the UE feeds back k as part of the $W_1$ indication, the $W_1$ for ranks 3-4 consists of the two first PMI indices $i_{1,1}$ and $i_{1,2}$ in addition to the the orthogonal beam group parameter k. In the case where the slowly varying PMI and the more frequently varying PMI are reported separately with different periodicities, it is also a problem how the orthogonal beam group parameter k should be reported.

There is generally disclosed a method for operating a network node in a wireless communication network. The method may comprise configuring, e.g. by the network node, a terminal or UE, for performing reporting and/or performing one or more terminal reports. The method may comprise determining, e.g. based on terminal and/or channel status reports from one or more terminals or UEs (in particular, based on a timeline and/or time behaviour indicated by such reports over time), different timings (e.g., a first and a second timing) for reporting of first angular transmission information and/or second angular transmission information.

There is generally disclosed network node for a wireless communication network. Network node may be adapted for configuring, and/or comprise a configuring module for configuring, a terminal or UE, for performing reporting and/or performing one or more terminal reports. The network node may be adapted for, and/or comprise a determining module for, determining, e.g. based on terminal and/or channel status reports from one or more terminals or UEs (in particular, based on a timeline and/or time behaviour indicated by such reports over time), different timings (e.g., a first and a second timing) for reporting of first angular transmission information and/or second angular transmission information.

Configuring may be based on such determining. Such determining may generally comprise determining which angular transmission information, in particular which dimensional aspect, (e.g., PMI index) varies faster (and/or more quickly). The shorter timing may be assigned to the angular transmission information varying faster. Generally, without limiting the general applicability, the first timing may be considered to be the shorter timing, and the first angular transmission information may be considered to be the one varying more quickly. It should be noted that, depending on operation conditions, the role of the first and second angular transmission information respective corresponding dimensions may change and/or be reversed over time.

There may be considered a method for operating a terminal or user equipment in a wireless communication network. The method may comprise performing, e.g. by the terminal or user equipment, reporting based on a configuration, which may be received from a network node, e.g. a network node as described herein. The configuration may indicate the timing of reporting of first angular transmission information (which may be referred to as first reporting) and/or indicating the timing of reporting of second angular transmission information (which may be referred to as second reporting). In particular, the method may comprise reporting first angular transmission information according to, and/or with, a first timing (which may be referred to as first reporting), and/or reporting second angular transmission information according to, and/or with, a second timing (which may be referred to as second reporting).

There may also be considered a terminal or UE for a wireless communication network, the terminal or user equipment being adapted for performing, e.g. by the terminal or user equipment, reporting based on a configuration, which may be received from a network node, e.g. a network node as described herein. The configuration may indicate the timing of reporting of first angular transmission information (which may be referred to as first reporting) and/or indicating the timing of reporting of second angular transmission information (which may be referred to as second reporting).

Generally, configuring may comprise, e.g. directly or indirectly (or explicitly or implicitly), indicating the timing of reporting of first angular transmission information (which may be referred to as first reporting) and/or indicating the timing of reporting of second angular transmission information (which may be referred to as second reporting). Configuring may utilise high-level signaling, e.g. on a layer above the physical or radio layers, e.g. using RRC signaling or layer (or corresponding), or application layer signaling.

The timing for the first reporting (also referred to as first timing) may be different from the timing of the second reporting (also referred to as second timing). The timing for the first reporting may be such that reporting pertaining to a quicker varying angular transmission information (which may in particular be first reporting) is performed more often and/or quicker than the second reporting, e.g. in a time interval covering at least one subframe, in particular more than one subframe. The first reporting may pertain to angular transmission information and/or parameter/s and/or behaviour (in particular, a first PMI index) in the first dimension varying more quickly than information and/or parameters and/or behaviour (in particular, a second PMI index) in the second dimension. A configuration generally may be provided and/or be based on such configuring. It may be considered that a configuration comprises corresponding configuration data, which may indicate the timing/s and/or corresponding or additional information, e.g. pertaining to performing measurements, e.g. on which signal/s and/or cell/s the measurements are to be performed, and/or which measurement to perform and/or when to perform them, and/or to evaluation of measurements and/or results.

Angular transmission information may generally indicate and/or comprise and/or pertain to an angular aspect of beamforming and/or MIMO operation or transmission, e.g. a PMI index (and/or beam group indicator, e.g. k) as disclosed herein, and/or an indication thereof and/or an indication of an angular precoder component. The angular transmission information may be comprised in a corresponding message. In particular, a first message may comprise first angular transmission information, and/or a second message may comprise second angular transmission information. A beam group indication or indicator may be comprised in one of the messages (in particular, the first message and/or the message with the shorter or quicker timing), e.g. jointly encoded with other parameter/s, e.g. a PMI index (it may be considered that the other (second) message does not comprise a beam group indicator).

First angular transmission information may pertain to a first dimension and/or second angular transmission information may pertain to a second dimension. The first and the second dimension may be different, in particular orthogonal to each other. The dimensions may correspond to dimensions of an arrangement of antenna elements (in particular physical elements) and/or to one or more ports or precoders. A port or precoder may generally comprise at least two (in particular, a first and a second) angular component, which may each correspond to one of the dimensions. An antenna arrangement may generally be two-dimensional, in particular pertaining to the first and second dimension. Transmission information may pertain to transmission from the network node/network/configuring node. It may be considered that angular transmission information comprises one or more parameters, in particular on or more angular transmission parameters and/or beamforming parameters. A PMI index as discussed herein and/or PMI indicator/s may be seen as representative/s of such information and/or parameter/s. A first PMI index may pertain to the first dimension, and/or a second PMI index may pertain to a second dimension. Angular transmission information may represent and/or indicate such a PMI index.

Angular transmission information may for example comprise a beam group indication or corresponding indicator, and/or a rank indication or corresponding indicator. It may be considered that configuring comprises indicating which angular transmission information (first or second, in particular in the sense of an exclusive or or XOR) is to comprise a beam group indication/indicator. In particular, the configuring may comprise indicating that the angular transmission information with the shorter (or quicker) timing (in particular, first timing), includes the beam group indication or indicator. The other angular transmission information may in particular not comprise such indication/indicator). It may be considered that the shorter or quicker timing pertains to reporting (which may be the first reporting) angular transmission information comprising a PMI index and a beam group indication or indicator, whereas the other (second) timing pertains to angular transmission information comprising a different (second) PMI index, but no beam group indication or indicator.

A timing may comprise and/or pertain to a periodicity and/or time interval and/or one or more points in time. Indicating a timing may comprise indicating, e.g. by a parameter or message or indicator, a periodicity and/or time interval and/or one or more points in time. The timing may pertain and/or indicate when a reporting is to be performed, e.g. when measurements are to be performed and/or angular transmission information is to be transmitted. The shorter or quicker timing may represent the timing according to which the reporting is performed more often and/or quicker and/or has the shorter time interval between two occurrences of the reporting.

It may generally be considered that reporting on first angular transmission information is performed (or occurs) multiple times, in particular periodically, at least within a given timeframe. Similarly, reporting on second angular transmission information is performed (or occurs) multiple times, in particular periodically, at least within a given timeframe. The timeframe/s may be defined as between two configurings performed on the terminal or UE, and may be larger than the periodicity or time interval between respective reporting occurrences. The terms first and second in this context may be considered to refer to the type of angular transmission information respective the dimension it pertains to, not necessarily to the order of the reporting performed in time (although the first and second moniker may internally be changed according to operation conditions, see above, such that the first reporting may at least be performed more often than the second reporting).

Explicitly configuring may comprise providing one or more parameters or indicators, in particular binary indicators, (directly) indicating the first timing and/or second timing, and/or indicating whether a reporting or timing is associated to the shorter (or longer) timing, e.g. for the first angular transmission information, or the second, or both. In this context it may be considered to provide information indicating the actual timing values (e.g., periodicity, interval and/or point/s in time, e.g. starting point and/or one or more occurrence times) for a shorter/quicker timing and a longer timing in at least on separate message from an indication of which angular transmission information (first or second) is associated to shorter and which to the longer timing. The longer timing generally refers to the timing which is not the shorter timing; the comparison pertains to the two timings mentioned herein.

Implicitly configuring may comprise indicating whether a reporting and/or angular transmission information (first or second) is associated to a shorter (or) longer timing for example utilising codebook configuration information, in particular pertaining to a configurable codebook as described herein (e.g., a class A codebook or similar for future evolutions or technologies). Implicitly configuring may be performed with (re-) configuring the codebook, e.g. based on operational conditions and/or changes in such.

Alternatively (independent of the above) or additionally (in the context of the above), there may be considered:

To address the problem of how to identify the dimension corresponding to the slowly varying PMI and the dimension corresponding to the more frequently varying PMI at the UE, this disclosure provides two solutions (which may be considered to implicitly or explicitly configuring), which may be implemented alternatively or in combination.

In a first solution (which may be seen as pertaining to implicit configuring), the identification of the slowly varying PMI and the more frequently varying PMI are identified implicitly using the RRC parameters $N_1$, $N_2$, $O_1$ and $O_2$ which are used to configure the Release 13 class A codebook.

In a second solution (which may be seen as pertaining to explicit configuring), the identification of the slowly varying PMI and the more frequently varying PMI are identified explicitly via a RRC configured binary parameter.

To address the problem of how the orthogonal beam group parameter k should be reported, a solution based on jointly encoding and reporting the orthogonal beam group parameter with the more frequently varying PMI is presented.

An approach 1: Implicit Dimension Identification is discussed herein.

In this variant, the identification of which index among the two first PMI indices $i_{1,1}$ and $i_{1,2}$ corresponds to the slowly varying PMI is identified implicitly by reusing the already agreed RRC parameters $N_1$, $N_2$, $O_1$ and $O_2$. Recall from the above that $O_1$ and $O_2$ respectively represent the oversampling factors in the first dimension and the second dimension; the number of antenna ports in the first dimension and the number of antenna ports in the second dimension are denoted by $N_1$ and $N_2$, respectively. Given an ($N_1$, $N_2$) pair, the two possible fixed pairs ($O_1$, $O_2$) allowed for each ($N_1$,$N_2$) are given in Table 1.

Figure 7:
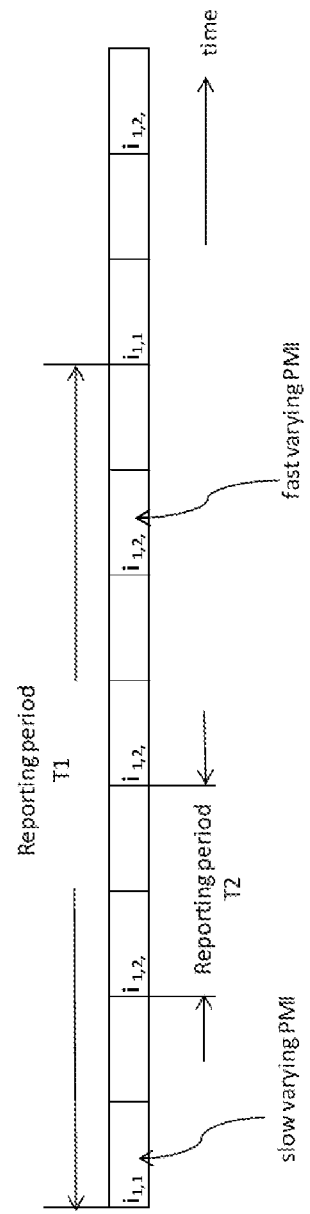
FIG. 7, showing an example of PMI reporting.

The two possible fixed pairs ($O_1$, $O_2$) allowed for each ($N_1$,$N_2$) can be grouped into combination 1 and combination 2 as shown in Table 11. Then the slowly varying PMI can be implicitly identified using Table 11 as follows:

If ($O_1$, $O_2$) combination 1 in Table 11 is signalled for a RRC configured ($N_1$,$N_2$) pair satisfying both $N_1>1$ and $N_2>1$, then $i_{1,1}$ is identified as the slowly varying PMI and $i_{1,2}$ is identified as the more frequently varying PMI. For instance, if ($N_1$,$N_2$)=(2,3) and ($O_1$, $O_2$)=(8,8), then $i_{1,1}$ is identified as the slowly varying PMI and $i_{1,2}$ is identified as the more frequently varying PMI. In this case, $i_{1,1}$ will be reported with a larger periodicity (i.e. less frequently reported) than $i_{1,2}$ as part of the periodic CSI on PUCCH. An example is shown in FIG. 7, where $i_{1,1}$ is reported with a reporting period of T1, which is larger than the $i_{1,2}$ reporting period T2. Note that generally the P-CSI report will also include the $i_2$' index (described above) and CQI which are not shown in Figure for simplicity of illustration.

If ($O_1$, $O_2$) combination 2 in Table 11 is signalled for a RRC configured ($N_1$,$N_2$) pair satisfying both $N_1>1$ and $N_2>1$, then $i_{1,2}$ is identified as the slowly varying PMI and $i_{1,1}$ is identified as the more frequently varying PMI. For instance, if ($N_1$,$N_2$)=(2,3) and ($O_1$, $O_2$)=(8,4), then $i_{1,2}$ is identified as the slowly varying PMI and $i_{1,1}$ is identified as the more frequently varying PMI. In this case, $i_{1,2}$ will be reported with a larger periodicity (i.e. less frequently reported) than the reporting period corresponding to $i_{1,1}$ as part of the periodic CSI on PUCCH.

If the RRC configured ($N_1$,$N_2$) pair satisfies both $N_1=8$ and $N_2=1$, then no dimension identification is performed as there is only one dimension being used.

FIG. 7 shows an example of PMI reporting with $i_{1,1}$ as the slow varying PMI and $i_{1,2}$ as the fast varying PMI.

The grouping of specific ($O_1$, $O_2$) pair values into combination 1 and combination 2 in Table 11 is done such that the dimension with a higher angular spread (i.e., the dimension corresponding to the more frequently varying PMI) has the same or higher oversampling factor when compared to the dimension with the lower angular spread (i.e., the dimension corresponding to the slowly varying PMI).

Since the implicit solution relies on the configurable parameters $N_1$, $N_2$, $O_1$ and $O_2$, the solution in this variant can also be considered configurable with respect to the $N_1$, $N_2$, $O_1$, $O_2$.

TABLE 11

Combinations for implicit dimension identification

| $(N_1, N_2)$ | $(O_1, O_2)$ combination 1 | $(O_1, O_2)$ combination 2 |
|---|---|---|
| (8, 1) | (4, —) | (8, —) |
| (2, 2) | (4, 4) | (8, 8) |
| (2, 3) | (8, 8) | (8, 4) |
| (3, 2) | (4, 4) | (8, 4) |
| (2, 4) | (8, 8) | (8, 4) |
| (4, 2) | (4, 4) | (8, 4) |

In a more specific variant, the dimension corresponding to the slowly varying PMI is the vertical dimension and the dimension corresponding to the more frequently varying PMI is the horizontal dimension.

An approach 2: Dimension Identification via RRC Signaling is discussed.

In this variant, identification of which index among the two first PMI indices $i_{1,1}$ and $i_{1,2}$ corresponds to the slowly varying PMI is identified via RRC signaling. The eNodeB semi-statically configures the UE with a binary RRC parameter. In one example, if the binary parameter takes on one value (say 'zero'), then $i_{1,1}$ is identified as the slowly varying PMI and $i_{1,2}$ is identified as the more frequently varying PMI. If the binary parameter takes on the second value (say 'one'), then $i_{1,2}$ is identified as the slowly varying PMI and $i_{1,1}$ is identified as the more frequently varying PMI. Once dimension identification is complete, the identified slowly varying PMI is reported with a larger periodicity as part of the periodic CSI on PUCCH than the more frequently varying PMI.

Feedback of Orthogonal Beam Group Parameter k is discussed herein.

As described herein, the orthogonal beam group parameter k is only relevant to the class A codebooks corresponding to ranks 3-4 (i.e., there is no k parameter for Class A codebooks of ranks 1, 2, 5-8). Hence, it is desirable to feedback the k parameter to the eNodeB after the UE has reported the rank indication (RI). In this variant, the slowly varying PMI as identified by one of the variants or approaches described herein is jointly encoded with the RI and reported in one subframe as part of the periodic CSI on PUCCH. This jointly encoded report has a feedback periodicity of T1. If the UE determines the rank (i.e., RI) to be either 3 or 4, then the more frequently varying PMI as identified by one of the variants in described herein jointly encoded with the orthogonal beam group parameter k and reported in a different subframe as part of the periodic CSI on PUCCH with a feedback periodicity of T2.

If the UE determines the rank (i.e., RI) to be one among 1, 2, 5, 6, 7, 8, then k is not present in the corresponding codebooks, the more frequently varying PMI as identified by one of the variants or approaches described herein is reported as part of the periodic CSI on PUCCH with a feedback periodicity of T2. The feedback periodicity T1 is larger than the feedback periodicity T2. An example is shown in Figure for the case when the reported rank is either 3 or 4 and the slowly varying first PMI index is $i_{1,1}$. If the reported rank is one among 1, 2, 5, 6, 7, 8, the report with periodicity T2 in the example of in FIG. 8 will only contain the more frequently varying first PMI index $i_{1,2}$ and does not include k (as k is not applicable to the codebooks corresponding to ranks 1, 2, 5, 6, 7,8). Note that generally the P-CSI report will also include the $i_2'$ index (described herein) and CQI which are not shown in 8 for simplicity of illustration.

Figure 8:
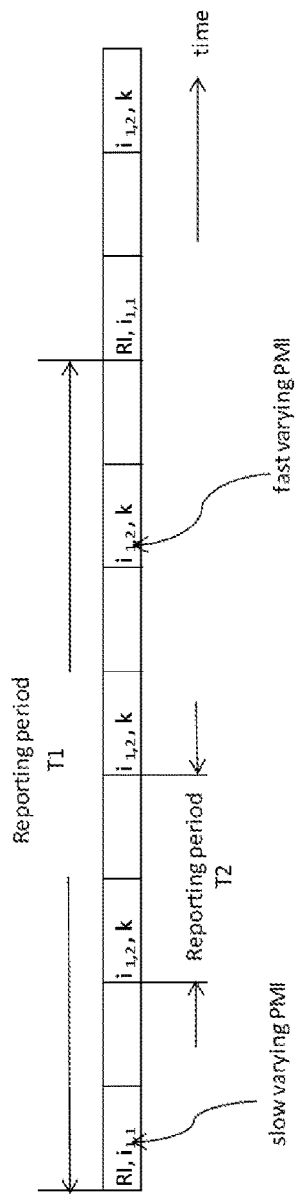
FIG. 8, showing another example relating to PMI reporting.

FIG. 8 shows an example of encoding the slow varying PMI with RI and fast varying PMI with parameter k when the reported rank is either 3 or 4.

Figure 9:
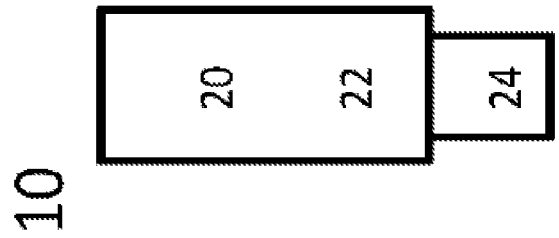
FIG. 9, showing an exemplary terminal.

FIG. 9 schematically shows a terminal 10, which may be implemented in this example as a user equipment. Terminal 10 comprises control circuitry 20, which may comprise a controller connected to a memory. A receiving module and/or transmitting module and/or control or processing module and/or CIS receiving module and/or scheduling module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry. In particular, the terminal may comprise dual radio circuitry (for independent TX/RX operation).

Figure 10:
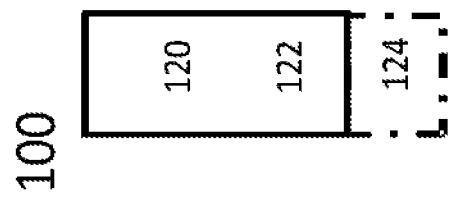
FIG. 10, showing an exemplary network node.

FIG. 10 schematically show a network node or base station 100, which in particular may be an eNodeB, for example a MeNB or SeNB. Network node 100 comprises control circuitry 120, which may comprise a controller connected to a memory. A receiving module and/or transmitting module and/or control or processing module and/or scheduling module and/or CIS receiving module, may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry.

Figure 11:
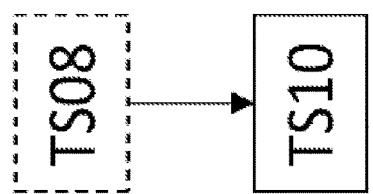
FIG. 11, showing an exemplary method for operating a terminal.

FIG. 11 shows a flow diagram representing an exemplary algorithm, respectively a method, for operating a terminal, which may be any terminal discussed herein. The method comprises an action TS10 of performing reporting based on a configuration, the configuration indicating the timing of reporting of first angular transmission information and/or indicating the timing of reporting of second angular transmission information. Optionally, the method may comprise an action TS08 of receiving the configuration. Action TS10 may be performed based on, and/or after, action TS08.

Figure 12:
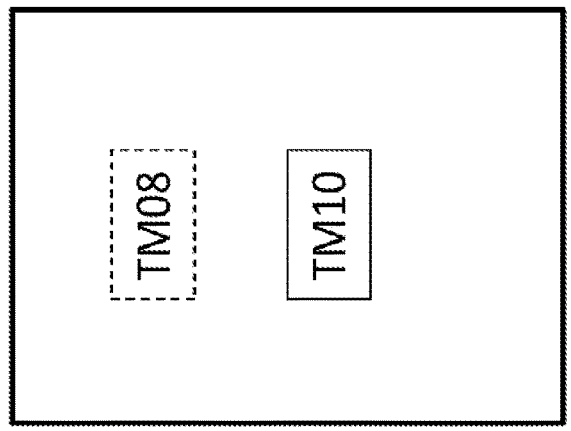
FIG. 12, showing another exemplary terminal.

FIG. 12 shows an exemplary terminal, which may be any terminal disclosed herein. The terminal comprises a reporting module TM10 for performing action TS10. The terminal may optionally comprise a receiving module TM08 for performing action TS08.

Figure 13:
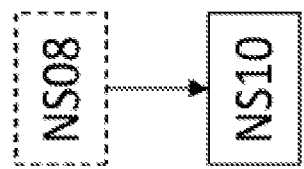
FIG. 13, showing an exemplary method for operating a network node.

FIG. 13 shows a flow diagram representing an exemplary algorithm, respectively a method, for operating a network node, which may be any network node discussed herein. The method comprises an action NS10 of configuring a terminal for performing reporting, wherein configuring comprises indicating different timings for reporting of first angular transmission information and second angular transmission information. Optionally, the method may comprise an action NS08 of determining different timings (e.g., a first and a second timing) for reporting of first angular transmission information and/or second angular transmission information.

Figure 14:
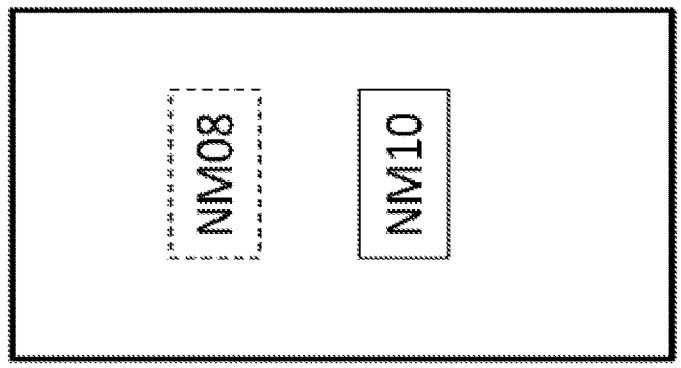
FIG. 14, showing an exemplary network node.

FIG. 14 shows an exemplary network node, which may be any network node disclosed herein. The network node comprises a configuring module NM10 for performing action NS10. It may optionally comprise a determining module NM08 for performing action NS08.

The solutions and approaches presented in this disclosure generally provide efficient mechanisms for identifying the dimension corresponding to the slowly varying PMI and the dimension corresponding to the more frequently varying PMI at the UE. The solutions for dimension identification in this disclosure are configurable with regards to the RRC parameters $N_1$, $N_2$, $O_1$ and $O_2$ which are used to configure the Release 13 class A codebook. The disclosure provides an efficient approach to report the beam group parameter k.

Additionally or alternatively, there may be considered

E1. A method (which may a method for operating a network node) of adapting periodic CSI feedback for a two dimensional antenna array, the method comprising:
a. Indicating to a UE to transmit a first report containing an indication of a first dimension of a two dimensional CSI report with a first period, wherein the first report is transmitted in one subframe
b. Indicating to the UE to transmit a second report containing an indication of a second dimension of a two dimensional CSI report with a second period, wherein the second report is transmitted is transmitted in one subframe E2 The method of E1, further comprising jointly encoding the second indication with a rank indicator to form a jointly encoded indication and transmitting the jointly encoded indication in one subframe.

E3 A method in (and/or for operating) a UE of identifying a precoding matrix index associated with a slowly varying channel dimension and another precoding matrix index associated with a more frequently varying channel dimension and reporting the identified indices with different periodicities as part of a periodic CSI report, wherein the UE is informed which channel dimension is slowly varying and the UE feeds back the PMI for the slowly varying dimension with a longer periodicity than the PMI associated with the more frequently varied dimension E4 The method of E3, where the identification of the indices are performed implicitly using multiple parameters that are used to configure a codebook that are composed of a combination of multiple precoding matrices in one or more dimensions.

E5 The method of E3 or E4, where the identification of the indices are performed explicitly using a semi-statically configured RRC parameter.

E6 A method for jointly encoding and reporting a beam group parameter where the beam group parameter is jointly encoded with the precoding matrix index associated with a more frequently varying channel dimension identified according to any of E1-E5.

Generally, there may be considered a network node adapted for performing any one of the methods for operating a network node described herein.

There may be considered a terminal or UE adapted for performing any one of the methods for operating a terminal described herein.

There may be considered a wireless communication system comprising a terminal and a network node as disclosed herein.

There is also disclosed a program product comprising code executable by control circuitry, the code causing the control circuitry to carry out and/or control any one of the method for operating a terminal or user equipment or network node as described herein, in particular if executed on control circuitry, which may be control circuitry of a radio node like a user equipment or a network node as described herein.

Moreover, there is disclosed a carrier medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code.

A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one memory, in particular at least one of volatile or non-volatile memory, a buffer, a cache, an optical disc, magnetic memory, flash memory, etc. Code may comprise instructions executable by control circuitry and/or parameters, which may be associated to instructions.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA.

A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include header information or a header and/or address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein.

A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A wireless communication network or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation.

A terminal may be implemented as a user equipment; it may generally be considered that a terminal is adapted to provide and/or define an end point of a wireless communication and/or for a wireless communication network. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or user equipment is adapted for one or more RATs, in particular LTE/E-UTRA.

It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted to support dual connectivity. It may comprise two independently operable transmitter (or transceiver) circuitries and/or two independently operable receiver circuitries; for dual connectivity, it may be adapted to utilize one transmitter (and/or receiver or transceiver, if provided) for communication with a master network node and one transmitter (and/or receiver or transceiver, if provided) for communication with a secondary network node. It may be considered that a terminal comprises more than two such independently operable circuitries.

A network node or base station, e.g. an eNodeB, may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station. A network node or base station may generally be adapted to allocate and/or schedule time/frequency resources of a network and/or one or more cells serviced by the base station. An eNodeB (eNB) may be envisioned as an example of a base station, e.g. according to an LTE standard. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or coordinating node and/or to allocate resources in particular for cellular communication via one or more than one cell.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands.

A network node, e.g. a base station or eNodeB, may be adapted to provide and/or define and/or control one or more cells, e.g. a group of cells, which may be carrier aggregated (CA) cells. The group of cells may comprise at least one primary cell, which may be considered to be a member of the group and/or to be associated to the group. The cell group may comprise one or more secondary cells (it should be noted that every group may comprise secondary cells, not only a secondary group; the secondary in this context refers to being secondary to the primary cell of a group). A primary cell may be adapted and/or utilised for providing control information (in particular allocation data, and/or scheduling and/or allocation information regarding the primary cell and/or the group of cells to and/or from a terminal connected for communication (transmission and reception) and/or configured with the cell. The control information may pertain to the primary cell and/or the group of cells. Each primary cell and/or the associated group may be associated to a specific network node. A master network node may be adapted to provide and/or service and/or define a primary cell in a master cell group. A secondary network node may be adapted to provide and/or service and/or define a secondary cell group.

Resources or communication resources may generally be frequency and/or time resources, which may comprises e.g. frames, subframes, slots, resource blocks, carriers, subcarriers, channels, frequency/spectral bands, etc. Allocated or scheduled resources may comprise and/or refer to frequency-related information, in particular regarding one or more carriers and/or bandwidth and/or subcarriers and/or time-related information, in particular regarding frames and/ or slots and/or subframes, and/or regarding resource blocks and/or time/frequency hopping information. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. a network node or allocation node, e.g. a base station, may be adapted to determine and/or transmit corresponding allocation or scheduling data, e.g. data indicating release or de-allocation of resources and/or scheduling of UL and/or DL resources. Accordingly, resource allocation may be performed by the network and/or by a network node; a network node adapted for providing resource allocation/ scheduling for one or more than one terminals may be considered to be a controlling node. Resources may be allocated and/or scheduled on a cell level and/or by a network node servicing and/or providing the cell.

Allocation data may be considered to be data indicating and/or granting resources allocated by a network node, e.g. a controlling and/or allocation node, in particular data identifying or indicating which resources are reserved or allocated, e.g. for cellular communication, which may generally comprise transmitting and/or receiving data and/or signals; the allocation data may indicate a resource grant or release and/or resource scheduling. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. A terminal may generally be adapted to perform transmission of data to, e.g. UL data, and/or reception of data from, a network node and/or to more than one network nodes, according to allocation data. Allocation data may be seen as an example of configuration data. Configuration data generally may comprise allocation data and/or control information or instruction, e.g. TPC and/or information indicating feedback (feedback configuration), in particular measurement feedback and/or a PMI configuration or setup. A PMI configuration or setup may indicate PMI/s for different dimensions to be sent at different times and/or time-intervals and/or with different periodicity. Different dimensions for PMI may indicated orthogonal arrangements, in particular vertical and horizontal. The dimensions may refer to angular beamforming profiles and/or to beamforming arrangements or procedures, in particular to precoders for different dimensions.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or future developments wireless communication technologies; however, this does not rule out the use of the present concepts and aspects in connection with additional or alternative mobile communication technologies such as the Global System for Mobile Communications (GSM). While the variants are partially described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

A device that is adapted or configured for specific functionality may comprise the hardware (e.g. circuitry) and/or software and/or firmware allowing it to provide the functionality or perform accordingly. Configuring a device may comprise setting operational parameters of the device; configuring for specific functionality and/or for or with a specific configuration may comprise setting such parameters to enable the device to provide the functionality and/or to operate according to the configuration. Operational parameters may comprise any parameter influencing the operation of the device, in particular pertaining to radio circuitry and/or reception or transmission characteristics. A device may configure itself and/or be configured by another device, e.g. by receiving corresponding configuration data from that device. Configuring may comprise transmitting (by the configuring device) or receiving (by the configured device) configuration data on any or any combination of protocol levels, e.g. on a physical or radio level and/or higher levels, e.g. RRC level (Radio Resource Control).

Configuration data for configuring a device for an adapted guarding time interval may comprise information indicating the type of symbol the adapted guarding time interval pertains to (e.g., UL/DL or transmission/receiving), and/or the (adapted) length of the guard interval and/or the core symbol, and/or the location of the guard interval associated in the symbol, in particular relating to the core symbol (e.g. prefix or suffix), and/or a duration for which the adapted guarding time length is valid (e.g., in terms of frames).

Configuring a terminal or UE, by a network or network node, may comprise transmitting, by the network or network node, one or more parameters and/or commands to the terminal or UE, and/or the terminal or UE changing it configuration and/or setup based on received parameters and/or commands from the network and/or the network node.

A terminal (also referred to as wireless device) may generally be a UE (User Equipment), in particular for LTE or later standards; the terms may be interchangeably used. It is noted that a terminal or UE may comprise and/or pertain to devices used or adapted for MTC (machine-type communication) or M2M (machine-to-machine communication), which do not require a person as user; such devices still may be seen as users of the network or RAT (Radio Access Technology).

A terminal being configured with a cell and/or carrier, and/or being connected to a network node via a cell, may be in a state in which it may communicate (transmit and/or receive data, e.g. with the network node) using the cell or carrier, e.g. being registered with the network for communication and/or being synchronized to the cell and/or carrier; in particular, the cell may be activated for the terminal.

A-CSI Aperiodic Channel State Information
CQI Channel Quality Indicator
CSI Channel State Information
CSR Codebook Subset Restriction
Config Configuration parameter associated with the LTE Release 13 Class A codebook
FD-MIMO Full Dimension Multiple Input Multiple Output
LTE Long Term Evolution
P-CSI Periodic Channel State Information
PMI Precoder matrix indicator
RRC Radio Resource Control
RI Rank Indication
CCA Clear Channel Assessment
DCI Downlink Control Information
DL Downlink
DMRS Demodulation Reference Signals
eNB evolved NodeB, base station
TTI Transmission-Time Interval
UE User Equipment
UL Uplink
LA Licensed Assisted
LA Licensed Assisted Access
DRS Discovery Reference Signal
SCell Secondary Cell
SRS Sounding Reference Signal
LBT Listen-before-talk
PCFICH Physical Control Format Indicator Channel
PDCCH Physical Downlink Control Channel
PUSCH Physical Uplink Shared Channel
PUCCH Physical Uplink Control Channel
RRM Radio Resource Management
CIS Transmission Confirmation Signal
3GPP $3^{rd}$ Generation Partnership Project
Ack/Nack Acknowledgment/Non-Acknowledgement, also NN
AP Access point
B1, B2, . . . Bn Bandwidth of signals, in particular carrier bandwidth Bn assigned to corresponding carrier or frequency f1, f2, . . . , fn
BER/BLER Bit Error Rate, BLock Error Rate;
BS Base Station
CA Carrier Aggregation
CC component carrier (a carrier in a carrier aggregate)
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE)
eNB evolved NodeB; a form of base station, also called eNodeB
E-UTRA/N Evolved UMTS Terrestrial Radio Access/ Network, an example of a RAT
f1, f2, f3, . . . , fn carriers/carrier frequencies; different numbers may indicate that the referenced carriers/ frequencies are different
f1_UL, . . . , fn_UL Carrier for Uplink/in Uplink frequency or band f1_DL, . . . , fn_DL Carrier for Downlink/in Downlink frequency or band
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
MDT Minimisation of Drive Test
MME Mobility Management Entity; a control entity of a wireless communication network (LTE) providing control functionality e.g. for radio network nodes like eNBs
NW Network
OFDM Orthogonal Frequency Division Multiplexing
O&M Operational and Maintenance
OSS Operational Support Systems
PC Power Control
PCell Primary Cell (e.g. in CA, in particular a primary cell of a Master Cell Group)
PDCCH Physical DL Control CHannel
PH Power Headroom
PHR Power Headroom Report
Pscell primary cell of a secondary cell group
PSS Primary Synchronization Signal
PUSCH Physical Uplink Shared CHannel
R1, R2, . . . , Rn Resources, in particular time-frequency resources, in particular assigned to corresponding carrier f1, f2, . . . , fn
RA Random Access
RACH Random Access Channel
RAN Radio Access Network
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SCell Secondary Cell (e.g. in CA)
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency The abbreviations may be used according to LTE standard use, if applicable.

The invention claimed is:

1. A method for operating a terminal in a wireless communication network, the method comprising:
 performing reporting based on a configuration, the configuration indicating a timing of reporting of first angular transmission information and/or indicating a timing of reporting of second angular transmission information;
 wherein the timing of reporting of the first and second angular transmission information is such that reporting pertaining to a quicker varying angular transmission information of the first and second angular transmission information is performed more often and/or quicker than the reporting pertaining to the other angular transmission information of the first and second angular transmission information; and
 wherein the quicker varying angular transmission information of the first and second angular transmission information comprises a beam group indicator and a Precoder Matrix Indicator (PMI).

2. A terminal for a wireless communication network, the terminal comprising:
 communication circuitry; and
 processing circuitry configured to:
 perform reporting based on a configuration, the configuration indicating a timing of reporting, via the communication circuitry, of first angular transmission information and/or indicating a timing of reporting of second angular transmission information;
 wherein the timing of reporting of the first and second angular transmission information is such that reporting pertaining to a quicker varying angular transmission information of the first and second angular transmission information is performed more often and/or quicker than the reporting pertaining to the other angular transmission information of the first and second angular transmission information; and
 wherein the quicker varying angular transmission information of the first and second angular transmission information comprises a beam group indicator and a Precoder Matrix Indicator (PMI).

3. A method for operating a network node in a wireless communication network, the method comprising:
 configuring a terminal for performing reporting, wherein configuring comprises indicating different timings for reporting of first angular transmission information and second angular transmission information;
 wherein a shorter timing is assigned to the angular transmission information of the first and second angular transmission information varying faster; and
 wherein the fast varying angular transmission information of the first and second angular transmission information comprises a beam group indicator and a Precoder Matrix Indicator (PMI).

4. A network node for a wireless communication network, the network node comprising:
 communication circuitry; and
 processing circuitry configured to:
 configure a terminal for performing reporting, wherein configuring comprises indicating, via the communication circuitry, different timings for reporting of first angular transmission information and second angular transmission information;

wherein a shorter timing is assigned to the angular transmission information of the first and second angular transmission information varying faster; and wherein the fast varying angular transmission information of the first and second angular transmission information comprises a beam group indicator and a Precoder Matrix Indicator (PMI).

\* \* \* \* \*